United States Patent [19]

Maemura et al.

[11] Patent Number: 5,159,465
[45] Date of Patent: Oct. 27, 1992

[54] FACSIMILE MACHINE HAVING A TRANSMISSION SPEED SELECTIVE SHIFTDOWN FUNCTION

[75] Inventors: Koichiro Maemura; Shigetaka Tanaka, both of Atsugi, Japan

[73] Assignee: Ricoh Company, Ltd., Tokyo, Japan

[21] Appl. No.: 253,621

[22] Filed: Oct. 5, 1988

[30] Foreign Application Priority Data

| Oct. 9, 1987 [JP] | Japan | 62-253541 |
| Nov. 4, 1987 [JP] | Japan | 62-277369 |
| Nov. 9, 1987 [JP] | Japan | 62-280945 |
| Jun. 24, 1988 [JP] | Japan | 63-154916 |

[51] Int. Cl.$^5$ ............................................. H04N 1/00
[52] U.S. Cl. ................................. 358/405; 358/434; 358/435
[58] Field of Search ............... 358/434, 435, 405, 438, 358/439, 400, 442; 371/32, 5, 33, 34, 5.5; 375/58, 121; 379/100

[56] References Cited

U.S. PATENT DOCUMENTS

| 4,110,558 | 8/1978 | Kageyama et al. | 371/5 |
| 4,153,916 | 5/1979 | Miwa et al. | 358/439 |
| 4,583,124 | 4/1986 | Tsuji et al. | 358/440 |
| 4,589,111 | 5/1986 | Adachi | 371/32 |
| 4,601,035 | 7/1986 | Marzec et al. | 371/32 |
| 4,630,126 | 12/1986 | Kaku et al. | 358/438 |
| 4,680,773 | 7/1987 | Amundson | 375/121 |
| 4,710,925 | 12/1987 | Negi | 371/5 |
| 4,720,829 | 1/1988 | Fukasawa et al. | 371/5.5 |
| 4,779,274 | 10/1988 | Takahashi et al. | 371/32 |

Primary Examiner—Edward L. Coles, Sr.
Assistant Examiner—Thomas D. Lee
Attorney, Agent, or Firm—Oblon, Spivak, McClelland, Maier & Neustadt

[57] ABSTRACT

A facsimile machine includes a data transmission speed shift down function according to which the data transmission speed is shifted down from its initial speed to one of a plurality of new speeds based on a ratio between the total number of data frames initially transmitted to a receiver and the number of data frames requested for retransmission by the receiver. In this manner, an optimal new data transmission speed may be accurately and expeditiously determined. A parameter memory containing information regarding destination areas to which an error correction mode of operation is to be used may be preferably provided in a facsimile machine having both of an error correction mode (ECM) and a normal mode. With this structure, the ECM mode can be automatically set. In such a facsimile machine having both an ECM and a normal transmission modes, a common buffer memory is provided for temporarily storing coded image information either in the ECM or normal transmission mode.

27 Claims, 17 Drawing Sheets

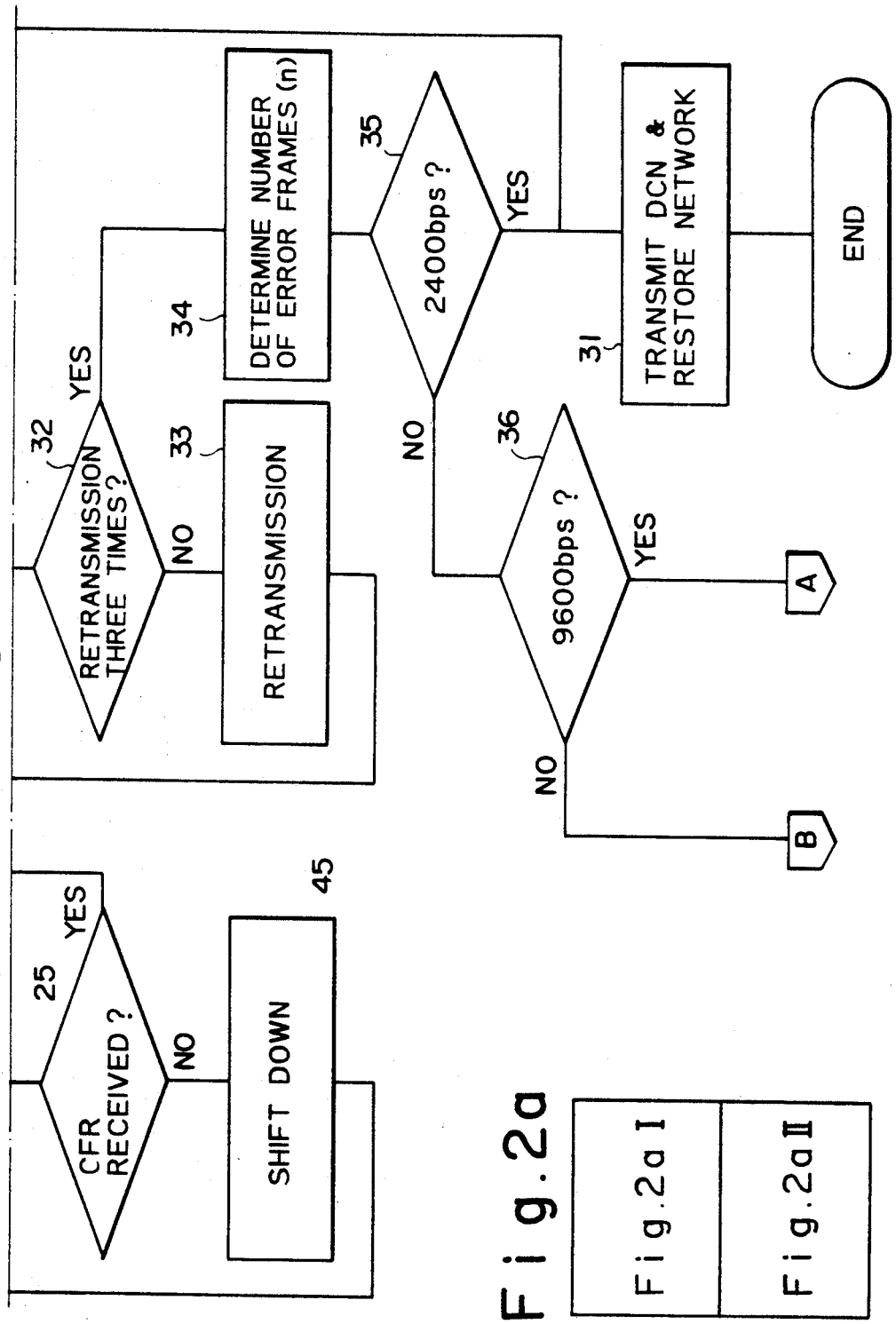

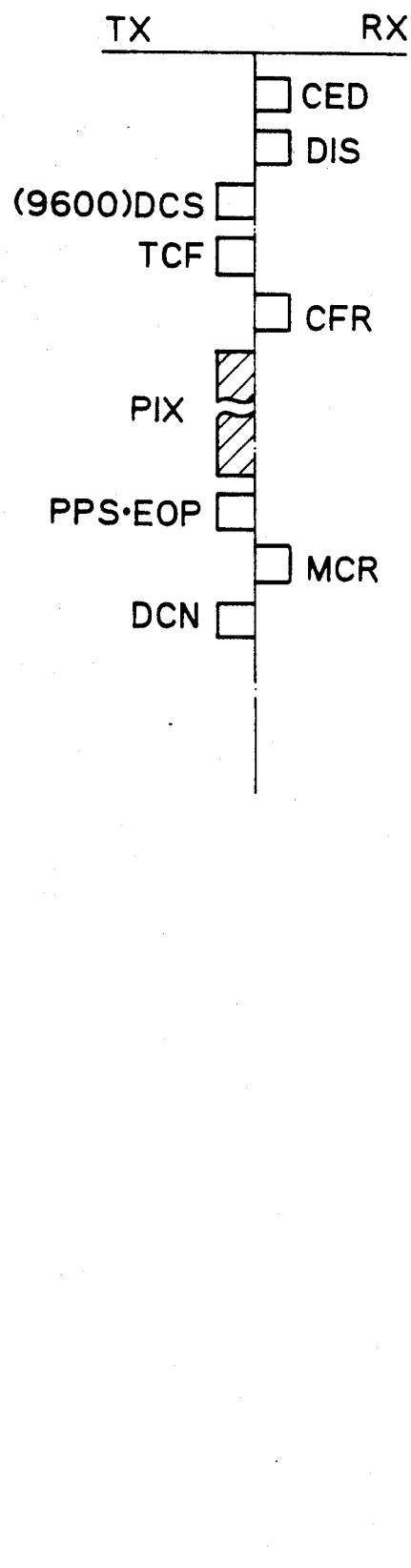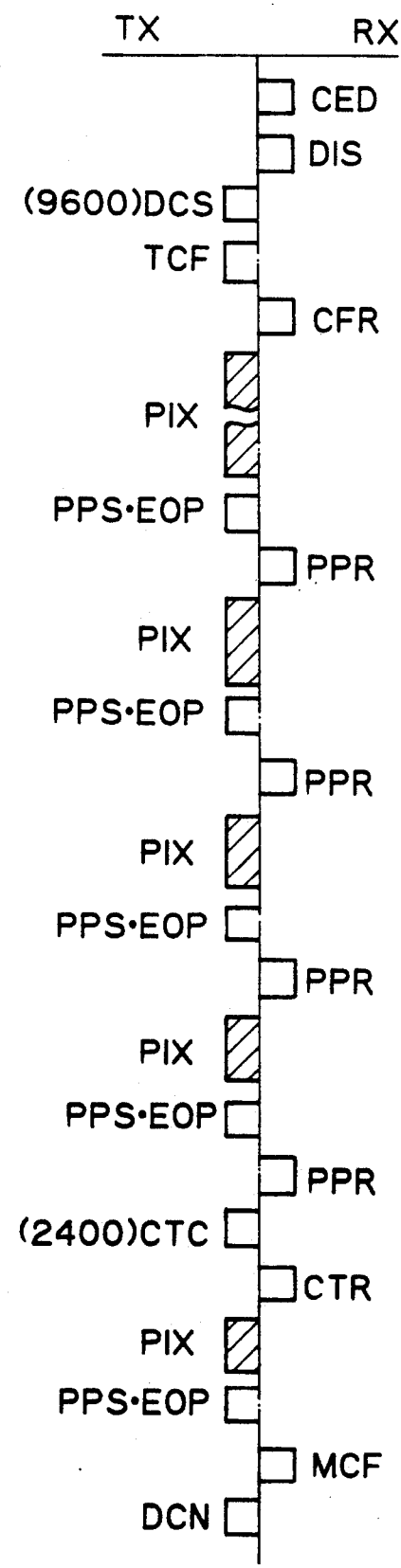

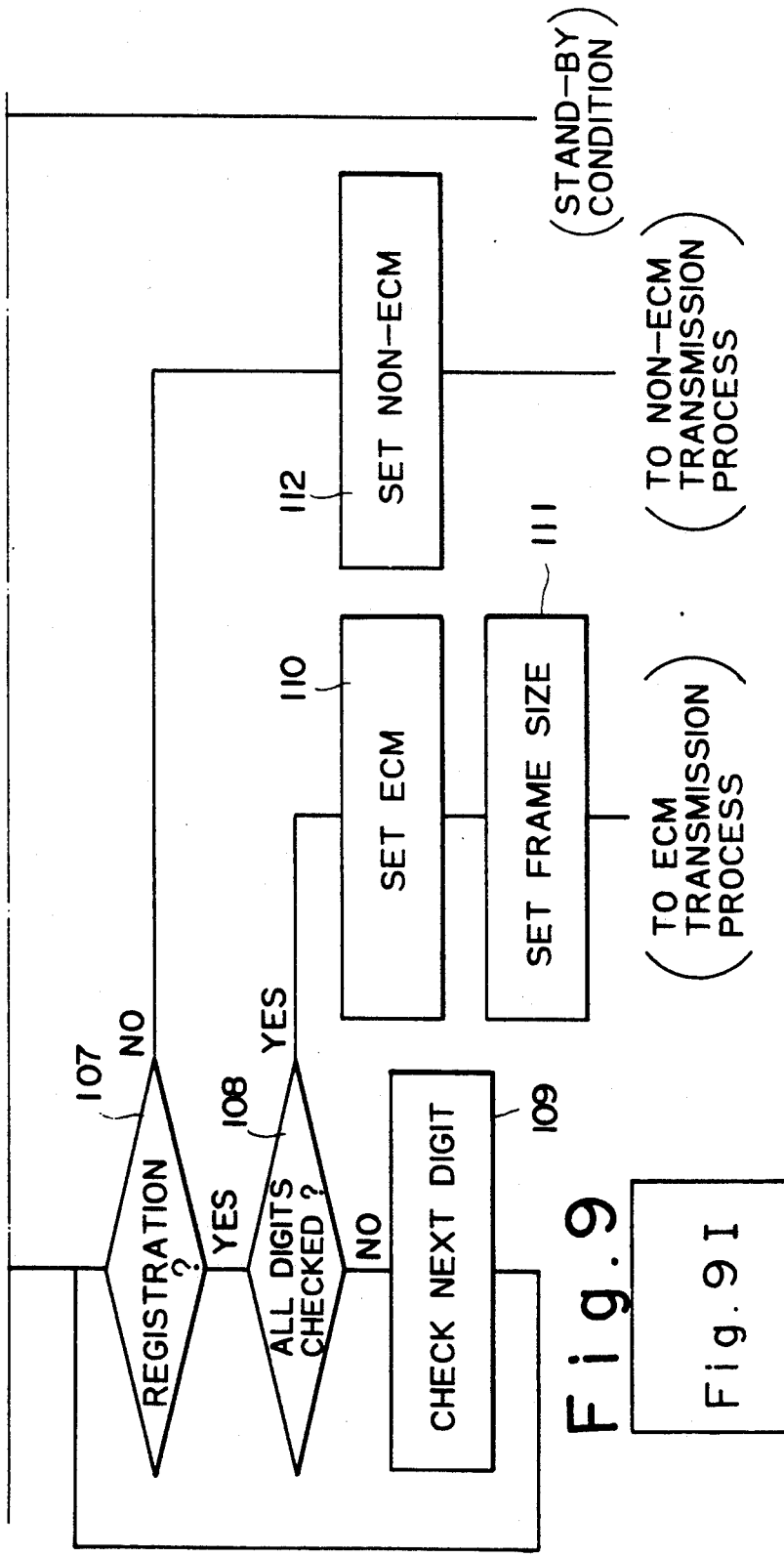

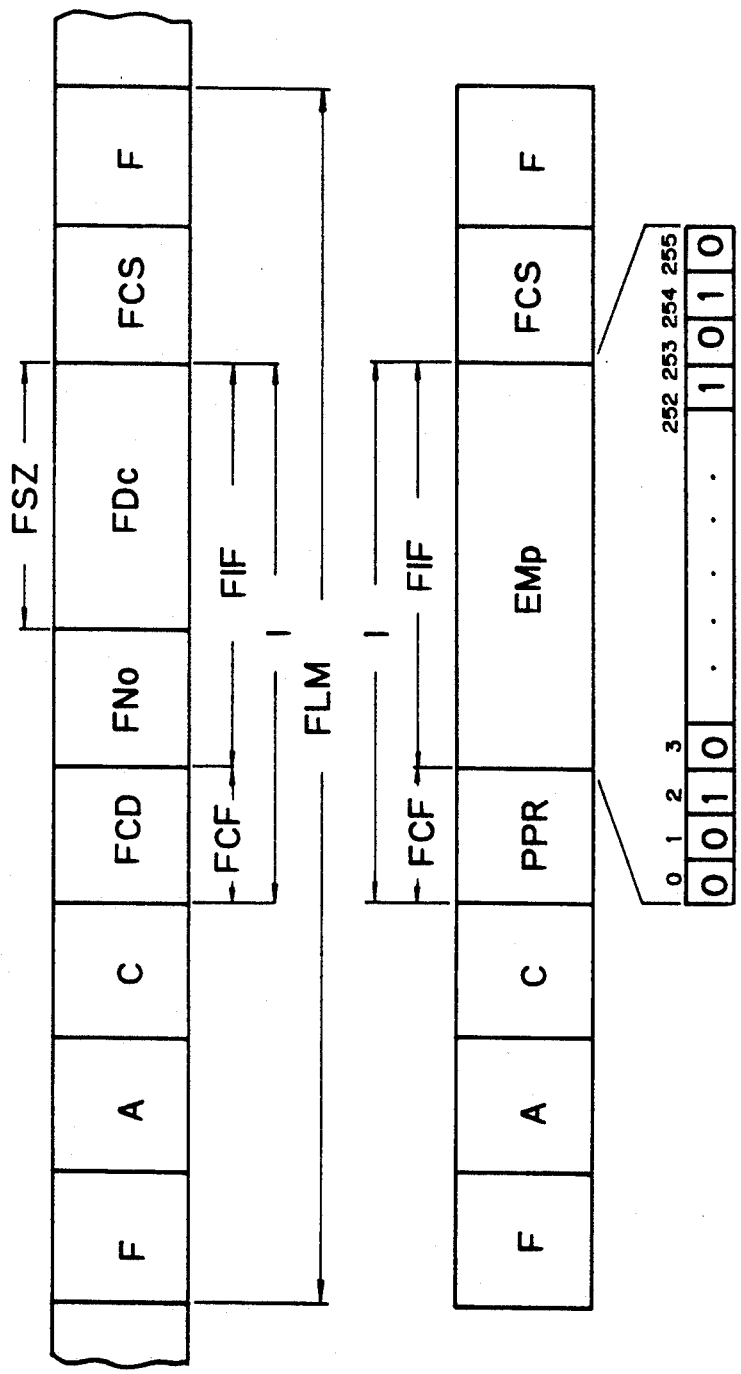

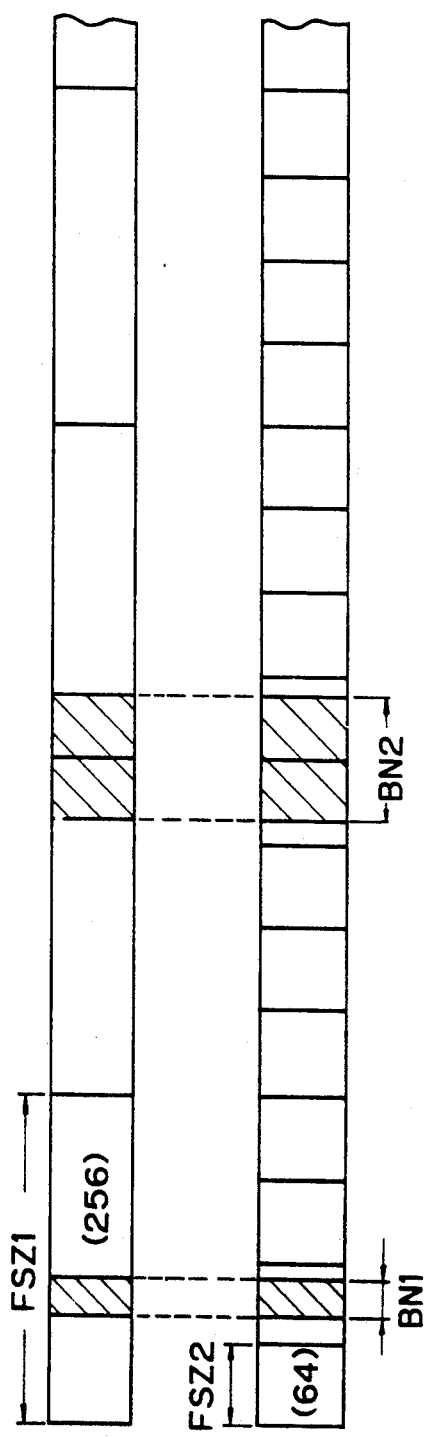

FACSIMILE MACHINE HAVING A TRANSMISSION SPEED SELECTIVE SHIFTDOWN FUNCTION

BACKGROUND OF THE INVENTION

1. Field of the Invention

This invention generally relates to a facsimile machine, and, in particular, to a facsimile machine having a function of shifting down its data transmission speed depending on network conditions.

2. Description of the Prior Art

Typically, use is made of a telephone network as a transmission line for facsimile data transmission. In the case of a telephone network, the network condition is liable to change by noises or the like, in particular when a long-distance communication, such as oversea communication, is to be carried out. When a facsimile communication is carried out under such condition, there occurs many errors in transmission of image information so that there may be a case in which an image cannot be reproduced accurately at the receiver.

In a typical facsimile machine, for example, of G3 type, the network condition is examined by MODEM training prior to the initiation of transmission of image information, and the data transmission speed for transmitting image information is selectively determined depending on the status of the network condition.

CCITT has recently announced an additional recommendation for a communication control procedure called an error correction mode or simply referred to as ECM hereinafter in the form of Annex A to Recommendation T.30 on which facsimile machines of the G3 type are based. In the case of carrying out facsimile communication according to this ECM mode, image information is transmitted with a block comprised of a plurality of data frames as a unit, and when errors have occurred in the transmitted image information, those data frames for which the errors have occurred are retransmitted. And, if the number of retransmissions has exceeded a predetermined value, the data transmission speed is shifted down to carry out retransmission of the data frames at a lower data transmission speed.

Suppose that the network condition was excellent immediately after the initiation of transmission and then the network condition became extremely inferior after the initiation of transmission of image information. In this case, the data transmission speed was initially set, for example, at 9,600 bps for transmission of image information. However, the network condition deteriorates and many errors start to occur in transmitted data. As a result, a retransmission process is carried out repetitively over a predetermined number of times. If the data are not transmitted properly during this retransmission process, the data transmission speed is shifted down, for example, to 7,200 bps, and another retransmission process with this shifted down speed is carried out over a predetermined number of times. If the data are still not transmitted properly, the data transmission speed is further shifted down, for example, to 4,800 bps. And, in this manner, the data transmission speed may finally be shifted down to 2,400 bps.

In this manner, according to the conventional ECM mode, since the data transmission speed is shifted down one step at a time when the deteriorated network condition has occurred, it tends to take time until the retransmission of image information has been successfully carried out, which tends to prolong the overall communication time period.

In the above-described ECM mode, the image information after compression by coding is divided into frames of 256 or 64 bytes (octet; 1 byte = 1 octet = 8 bits) from the beginning thereof and the image information of one frame is shaped into a frame FLM of the type of HDLC (High Level Data Link Control) procedure as shown in FIG. 14a before transmission. The frame FLM includes a (front) flag sequence F of a predetermined bit pattern, an address field A of a predetermined bit pattern (global address), a control field C of a predetermined bit pattern unique to a particular facsimile machine, an information field I, a frame check sequence FCS for error detection, and a (rear) flag F arranged in the order mentioned. The information field I includes a facsimile control field FCF in which a facsimile transmission procedure signal is arranged and a facsimile information field FIF in which various information added to the facsimile transmission procedure signal is arranged. In this case, a facsimile coding data FCD of the facsimile transmission procedure signal is arranged in the facsimile control field FCF, and a frame number FNo indicating the order of the frame and a frame data FDc which is a coding of one frame size FSZ are arranged in the facsimile information field FIF. Since the frame number FNo is defined by eight bits of binary numbers, it can range only from 0 to 255 consecutively, so that a consecutive series of 256 frames is set as a block, and it is so structured that the receiver requests retransmission of such a block. If the image information of one page could not have been transmitted by one block, the remaining portion of the image information is inserted into the next block for transmission.

When the receiver makes a request of retransmission, it sends a frame of facsimile transmission procedure signal PPR (Partial Page Request signal) to the transmitter. It is to be noted that although the facsimile transmission procedure signal is transmitted in a frame format similar to that of this partial page request signal PPR with necessary parameters, it will be simply referred to as a PPR signal in the following description for the sake of convenience. This PPR signal contains a particular bit pattern PPR, which indicates it to be a PPR signal, in the facsimile control field FCF and also contains an error map data EMp of 256 bits in the facsimile information field FIF. In this error map data EMp, among one block of block data which has been transmitted, a data "0" is assigned to each of the frames for which no transmission error has occurred and a data "1" is assigned to each of the frames for which one or more errors have occurred, and these assigned data are arranged in the order of the frames. Upon receipt of this PPR signal, the transmitter retransmits only the data of those frames for which data "1" has been assigned in the error map data EMp to the receiver. By repetitively issuing this request for retransmission until all of the data errors have been eliminated, a received image without errors can be recorded at the receiver.

In transmitting image information as described above, the frame size may be set at one of two kinds, i.e., 256 bytes and 64 bytes. When this frame size has once been set during a pre-transmission procedure between the transmitter and the receiver, it remains valid until the transmission of one page of image information has been completed and it cannot be altered. When this frame size is set in a facsimile machine, if it is set semi-permanently, for example, by operating a switch or the like mounted on an internal circuit board provided in the facsimile machine, the following disadvantages could occur.

That is, if the frame size semi-permanently set at 256 bytes, since the number of frames constituting image information may be fewer, the amount of information to be added to the frame data may be less. Thus, as compared with the case in which the frame size is 64 bytes, the transmission time period may be shortened. However, for example, as shown in FIGS. 15a and 15b, if burst errors BN1 and BN2 have occurred in a transmission line, the amount of data to be retransmitted increases significantly as compared with the case in which the frame size is 64 bytes. Accordingly, if the network condition is inferior, the retransmission time period could be longer for frame size (FSZ1) of 256 bytes than for frame size (FSZ2) of 64 bytes, so that the overall image information transmission time period could also be longer for the 256 byte case. In this manner, in the case where transmission is to be carried out in the ECM mode, the frame size for which transmission can be carried out efficiently differs depending on the network condition. On the other hand, if the network condition is extremely good, since there is produced virtually no data errors in image transmission, there is no need to use the ECM mode. Similarly, if the network condition is extremely bad, since many data errors would occur also during retransmission, the use of the ECM is meaningless because it only prolongs the transmission time period without merit.

In a prior art facsimile machine having both of ECM and normal modes of operation, since the selection between the ECM and normal modes was not always made properly and the frame size for use in the ECM mode was not always set properly, the ECM mode was not used effectively at all times. It may be so structured that such setting be carried out by an operator; however, in such a case, since the operator is required to determine appropriate parameters before transmission, which is cumbersome to the operator and also impractical.

In the conventional G3 type normal mode, when transmitting image information in facsimile communication, the image information is first coded and the thus coded image information is normally stored in a FIFO buffer temporarily. And then the coded image information is read out of the buffer and transmitted to the receiver at the speed corresponding to the data transmission speed set in the MODEM. In this case, the FIFO buffer serves as an interface so as to absorb the discrepancy in timing between the coding of image information and transmission of image information from the MODEM.

In the case of the ECM mode, when constructing a HDLC data frame, the insertion of "0" data so as to avoid the occurrence of the same bit pattern as that of the flag in frame data and the CRC calculation for error checking operation are carried out. For this reason, in the case of facsimile communication in the ECM mode, during transmission, a block of the coded image information is temporarily stored in the buffer memory to thereby facilitate the carrying out of such processes as insertion of data "0" in the frame data and CRC calculation and to allow for the retransmission of image information. Thus, both in the conventional G3 type normal mode communication and the ECM mode communication, the image information to be transmitted is stored in a buffer. And, in the prior art facsimile machines, two separate buffers for storing image information were provided for the above-described two kinds of communication.

As described above, in accordance with the conventional ECM mode, when the network condition deteriorates after the initiation of transmission of image information, the communication time period tends to become prolonged. Furthermore, in the prior art facsimile machines, the ECM mode was neither properly set nor effectively used. Moreover, in the prior art facsimile machines, two separate buffers for temporarily storing image information were provided, which constituted one of the reasons for increased cost.

Japanese Patent Laid-open Pub. No. 58-198964, published Nov. 19, 1983, discloses a data transmission system using a shift-down/shift-up condition determining circuit 7 which calculates the number of retransmission operations selectively carries out either a two-step shift-down operation or a one-step shift-down operation depending on the manner of occurrence of retransmission operations, i.e., either continuous or continual. Japanese Patent Post-examination Pub. No. 60-36145, published Aug. 19, 1985, discloses a signal transmission system in which retransmission is carried out only when transmission errors have occurred in frame information having a high degree of importance and retransmission is not carried out for frame information having a low degree of importance even if transmission errors have occurred so as to shorten the overall transmission time period.

SUMMARY OF THE INVENTION

In accordance with one aspect of the present invention, there is provided a novel scheme for determining a data transmission speed in a facsimile machine, according to which the degree of shift-down of data transmission speed is determined based on a ratio between the total number of frames of image information which have been transmitted and the number of frames which have been indicated to contain data errors by the receiver. With this novel scheme, the communication time period may be maintained at minimum at all times. In this manner, since the data transmission speed is determined on the basis of the total number of transmitted frames and the number of frames which contain data errors as a result of transmission in this aspect of the present invention, the data transmission speed can be set properly and optimally depending on the network condition. Accordingly, retransmission is prevented from being carried out unnecessarily and thus the overall communication time period is always maintained at a minimum.

In accordance with another aspect of the present invention, there is provided a facsimile machine which includes a memory for storing information regarding areas to which "retransmission upon error occurrence" is applied. The information to be stored includes destination areas to which the ECM mode is to be applied and the frame size for each of the destination areas. Thus, when the destination information input by an operator belongs to one of the destination areas stored in the error retransmission application area memory, the ECM mode is activated and the frame size of the corresponding destination area stored in the memory is selected to be used for transmission of image information. In this manner, there is provided a structure to use the ECM mode most effectively. With this structure, it is not necessary for the operator to manually set appropriate conditions for using the ECM mode.

In accordance with a further aspect of the present invention, there is provided a facsimile machine including a common buffer memory which is used for temporarily storing coded image information until the retransmission processing has been completed to transmit all of the image information to the receiver properly during the ECM mode and for temporarily storing coded image information until transmission of image information has been completed during the conventional G3 type normal mode. With this structure, a common buffer memory is shared between the ECM and normal modes, so that it is only necessary to provide only one buffer memory, which contributes to reduce the number of parts in a facsimile machine.

It is therefore a primary object of the present invention to obviate the disadvantages of the prior art as described above and to provide an improved facsimile machine.

Another object of the present invention is to provide an improved facsimile machine having a novel data transmission speed shift-down function.

A further object of the present invention is to provide an improved data transmission method and system, such as a facsimile machine, capable of maintaining the overall transmission time at minimum at all times.

A still further object of the present invention is to provide a facsimile machine capable of using an ECM mode effectively.

A still further object of the present invention is to provide a facsimile machine which has high data transmission, high efficiency and is low cost.

Other objects, advantages and novel features of the present invention will become apparent from the following detained description of the invention when considered in conjunction with the accompanying drawings.

BRIEF DESCRIPTION OF THE DRAWINGS

FIGS. 2aI and 2aII, when combined as shown in FIG. 2a, and 2b show a flow chart illustrating the sequence of steps of a transmission process to be carried out by the facsimile machine shown in FIG. 1;

FIG. 3 is a timing chart showing a transmission control procedure in a normal transmission process;

FIG. 4 is a timing chart showing a transmission control procedure in a retransmission process;

FIG. 9 is an illustration showing how to combine FIGS. 9I and 9II;

FIGS. 9I and 9II, when combined as shown in FIG. 9, is a flow chart showing a sequence of steps for determining whether or not to set an error correction mode (ECM) and also a sequence of steps for determining a frame size in the case where the ECM mode is set;

FIG. 11b is a flow chart showing a sequence of steps of an image information transmission process to be carried out at the transmitter in the embodiment shown in FIG. 11a;

FIG. 12b is a flow chart showing a sequence of steps of an image recording process to be carried out at the receiver in the embodiment shown in FIG. 12a;

FIG. 14a is an illustration showing an example of the format of a frame to be used for transmitting image information arranged in the form of frames in accordance with the conventional error correction mode;

FIG. 14b is an illustration showing an example of a signal indicating a request for retransmission; and FIGS. 15a and 15b are illustrations which are useful for explaining a relationship between burst noise and a frame size.

DESCRIPTION OF THE PREFERRED EMBODIMENTS

Figure 1:
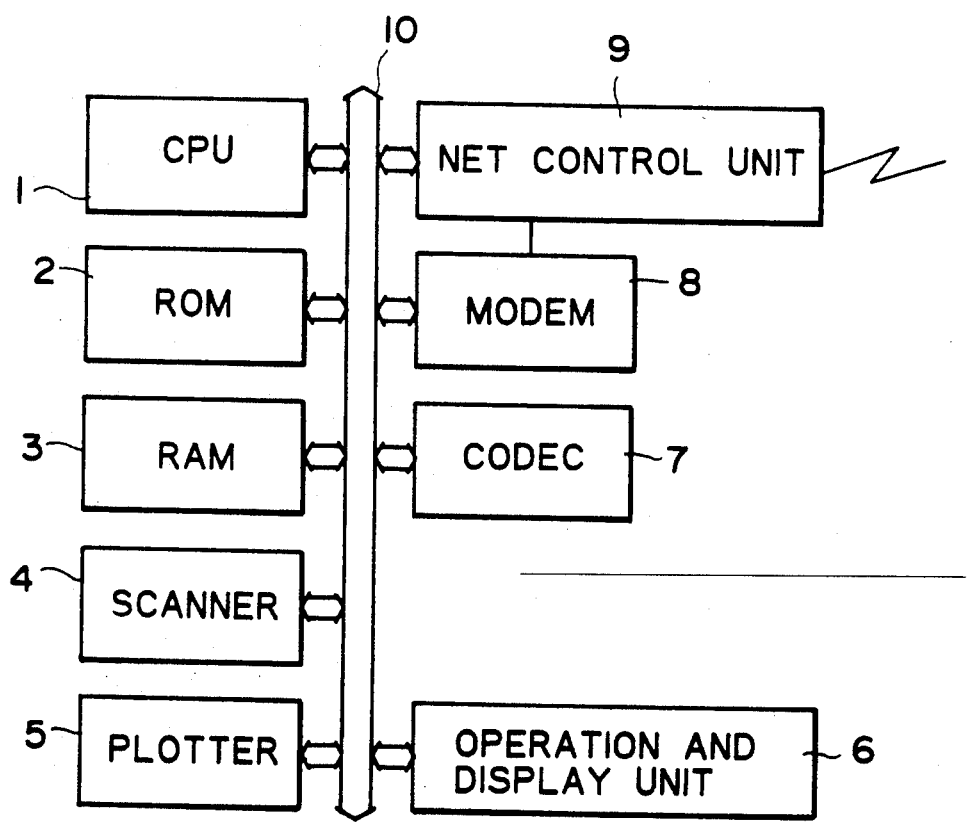
FIG. 1 is a block diagram showing the overall structure of a facsimile machine constructed in accordance with one embodiment of the present invention.

Referring now to FIG. 1, there is shown in block form the overall structure of a facsimile machine constructed in accordance with one embodiment of the present invention. As shown, the illustrated facsimile machine includes a CPU 1 which is in charge of the overall control of the present facsimile machine and which also implements a facsimile transmission control procedure process and a control program which is stored in a ROM 2. Also provided is a RAM 3 which provides a work area and a transmission buffer. It is to be noted that the transmission buffer is designed to have a memory capacity of at least 64 K bytes (K=1,024) so as to allow to store one block of frames of 256 bytes. The facsimile machine also includes a scanner 4 for reading an original to be transmitted at a predetermined resolution and a plotter 5 for recording a received image on a sheet of recording medium at a predetermined resolution. An operation and display unit 6 is also provided as a man-machine interface through which various operational commands and conditions may be supplied by an operator There are also provided a CODEC 7 which compresses image information to be transmitted by coding and decompresses received image information by decoding and a MODEM 8 which modulates and demodulates digital image data so as to allow such digital image data to be transmitted through a public telephone network or the like, which is an analog network. A net control unit 9 is also provided and it serves to establish a connection between the present facsimile machine and a public telephone network. It is to be noted that the net control unit 9 is provided with an automatic calling and call receiving function. Furthermore, CPU 1, ROM 2, RAM 3, scanner 4, plotter 5, operation and display unit 6, codec 7, MODEM 8 and net control unit 9 are all interconnected through a system bus 10 so that data may be exchanged between any two desired elements.

Figure 2A:
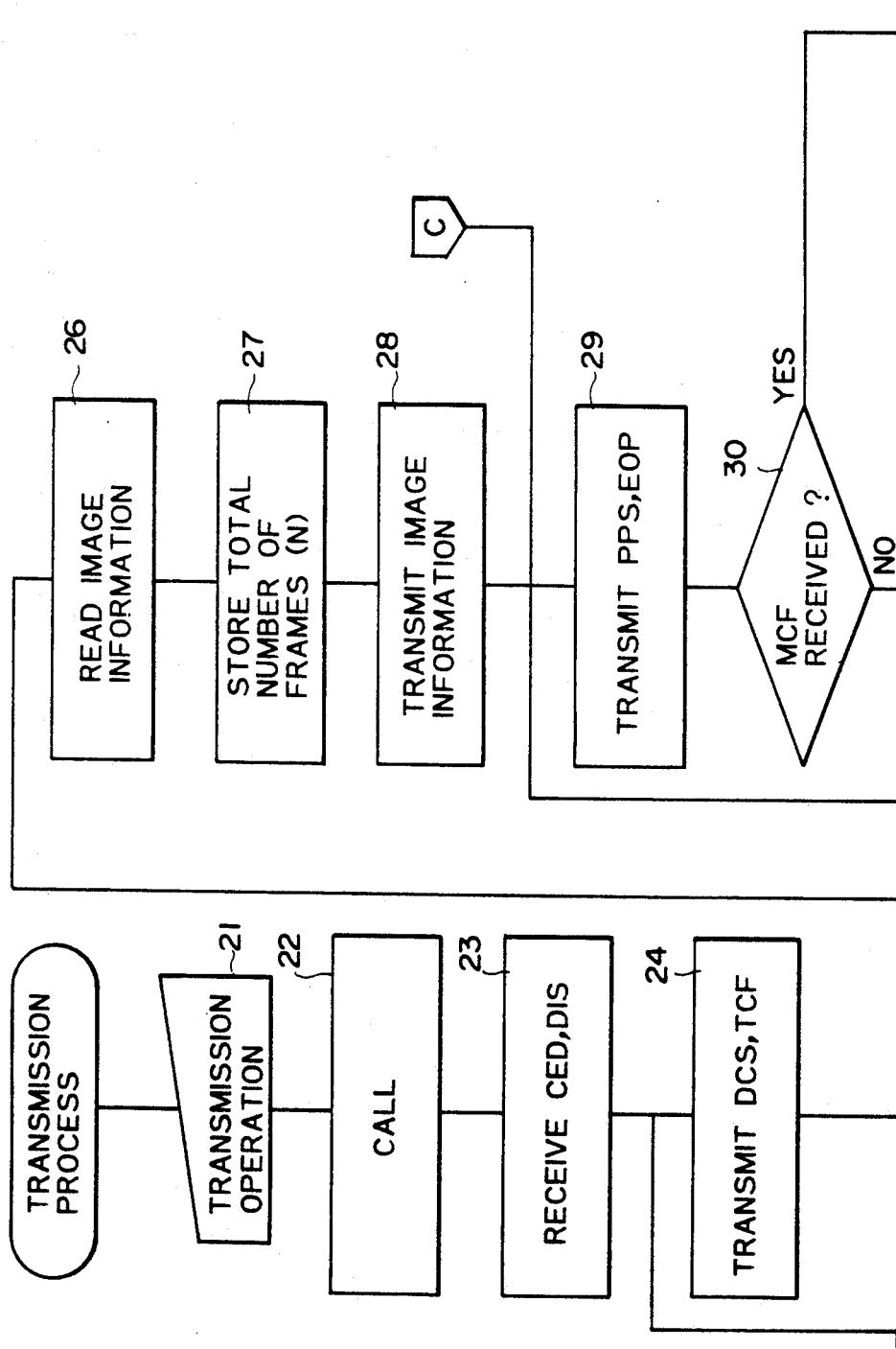
FIG. 2a is an illustration showing how to combine FIGS. 2aI and 2aII.
Figure 2B:
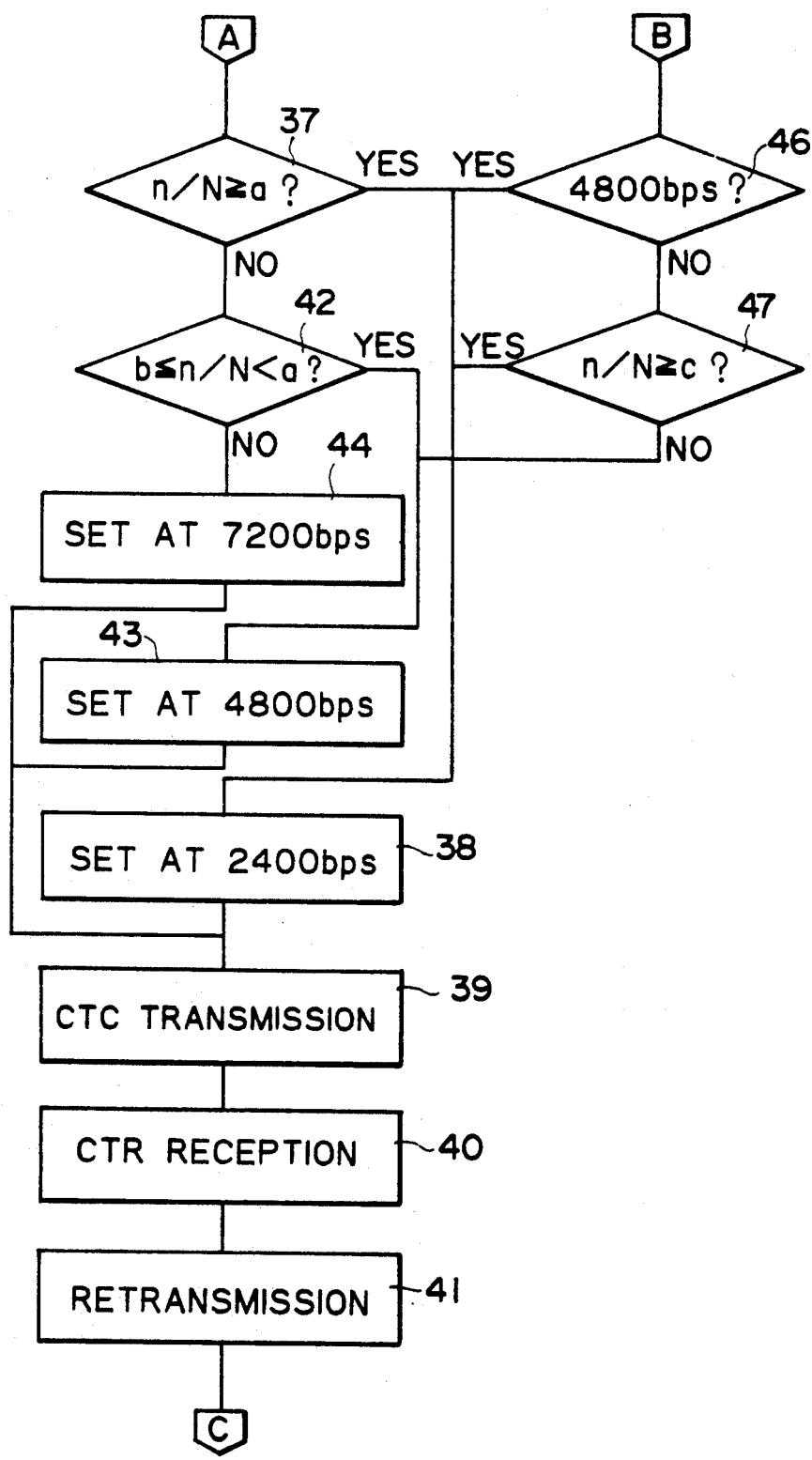

Now, the transmission operation of the facsimile machine having the above-described structure will be described with particular reference to FIGS. 2a and 2b. In the first place, an original to be transmitted is set in the scanner 4 and then a predetermined transmission operation, such as inputting of information regarding a destination of transmission, is carried out at the operation and display unit 6 (step 21). As a result, the net control unit 9 is activated (step 22), and when a call has been received by a receiver facsimile machine, a transmission control procedure is initiated as shown in FIG. 3, so that signals CED and DIS are first transmitted to a transmitter from the receiver (step 23). In response thereto, the transmitter transmits a signal DCS, together with a MODEM training signal and a signal TCF (step 24). In the above-mentioned DCS signal, the data transmission speed is designated at the highest speed of 9,600 bps.

In order to determine the status of the network, the receiver examines a predetermined data transmitted by the TCF signal and then transmits a CFR signal if the data error rate is equal to or lower than a predetermined value. At the transmitter, upon receipt of this CFR signal (Y of step 25), the scanner 4 is activated to have the original to be transmitted optically read (step 26) to thereby convert visual image information into electrical image information. The image information thus read is then coded by the codec 7, and the thus coded image information is arranged in the FIF section of a HDLC data frame, for example, by 256 bytes. These data frames are collected to define one block of up to 256 frames. Thus, in the case of 256 bytes per one frame, one block has a maximum of 64 k bytes. One block of image information is then temporarily stored in the RAM 3 and the total number of frames N is also stored in the RAM 3 (step 27). Then, this one block of image information is transmitted as image information PIX continuously at the above-designated data transmission speed of 9,600 bps (step 28).

Suppose that the original to be transmitted includes only one page and its image information is 64 k bytes or less. Upon transmission of all of the image information in succession, signals PPS and EOP are transmitted (step 29). The receiver receives the image information transmitted from the transmitter and examines the presence of any data error. If no data error has been found, then the receiver sends a signal MCF to the transmitter. If the transmitter receives this MCF signal (Y of step 30), then it transmits a signal DCN to have the network restored (step 31).

Now, a description will be had as to the case in which the network condition was initially excellent, but it deteriorates during transmission of image information PIX. In this case, as shown in FIG. 4, the transmission of image information was initiated at the data transmission speed of 9,600 bps similarly as the previous case, and, thereafter, signals PPS and EOP are transmitted. When the network condition deteriorates and there is produced a data error in the transmitted image information, the receiver detects this data error and stores information regarding which of the frames in one block of image information up to 256 frames contains the error. And, then, after having received a PPS·EOP signal, the receiver transmits a PPR signal to apprise the transmitter of the location of the frame which has produced the data error.

Upon receipt of this PPR signal (N of step 30 in FIG. 2a), the transmitter examines the number of retransmissions which have so far been carried out (step 32). In the present case, since this is the first event of retransmission (N of step 32), the image information corresponding to the frame position indicated by the PPR signal is read out of the RAM 3. And, then, the image information thus read out is retransmitted in a predetermined data frame (step 33). In the PPR signal, a plurality of frames may be designated, in which case the image information of each of the designated frames is transmitted one by one in succession, and upon completion, a PPS·EOP signal is transmitted (step 29). Thereafter, the above-described process is repeated and if the image information has not been properly received by the receiver once again, another PPR signal is issued to indicate the occurrence of data errors and to apprise the transmitter of the location of one or more frames which have produced data errors. In this case, the corresponding data frame or frames are again retransmitted in a similar manner.

When the number of retransmissions of this image information has reached three times (Y of step 32), the number of frames n which have been apprised to the transmitter to have produced data errors by PPR signals is determined (step 34). Thereafter, the current data transmission speed is examined. Since the currently set data transmission rate is 9,600 bps (N of step 35 to step 36 and to Y of step 36), a ratio of the above-described number of frames n which have produced data errors to the total number of initially transmitted frames N, i.e., error rate n/N, is calculated and then the calculated result is compared with a predetermined value a (step 37). The error rate n/N becomes larger in value as the network condition becomes worse. The predetermined value a is set to have a value of the error rate n/N which indicates that the data transmission rate should be reset to 2,400 bps because of inferior network condition.

If the calculated error rate n/N is equal to or larger than the predetermined value a (Y of step 37), the transmitter controls MODEM 8 or the like so as to set the data transmission rate at 2,400 bps (step 38). Then, as shown in FIG. 4, the transmitter transmits a CTC signal to the receiver to apprise the receiver of the fact that the data transmission rate should be shifted down to 2,400 bps (step 39). Upon receipt of this CTC signal, the receiver sets the internal condition at the data transmission rate of 2,400 bps and then sends a CTR signal. The transmitter, after confirming the receipt of this CTR signal (step 40), retransmits the image information of one or more of those frames designated by the PPR signal (step 41) and, thereafter, transmits a predetermined PPS·EOP signal (step 29). Since it is the lowest data transmission speed, the image information can be transmitted properly even if the network condition is relatively poor. Thus, the receiver will receive the image information without occurrence of data errors and then send a MCF signal to the transmitter (Y of step 30). In response thereto, the transmitter transmits a DCN signal to have the network disconnected (step 31). In this manner, even if the network condition was initially excellent but deteriorates significantly during transmission of image information PIX, the image information can be transmitted properly by implementing the shift-down operation of the data transmission speed only once as shown in FIG. 4.

On the other hand, at step 37, if the calculated value of error rate n/N is less than the predetermined value a (N of step 37), this value of error rate n/N is then compared with another predetermined value b (step 42). If the calculated error rate n/N is equal to or larger than the predetermined value b (Y of step 42), then the data transmission speed is set at 4,800 bps (step 43); whereas, if the calculated error rate n/N is less than the predetermined value b (Y of step 42), then the data transmission rate is set at 7,200 bps (step 44). Similarly with the predetermined value a, the predetermined value a is a value which sets the data transmission speed in accordance with the current network condition. Then, the image information is retransmitted in a similar manner with the newly set data transmission speed.

In the above-described embodiments, the data transmission speed was initially set at 9,600 bps. When the transmitter has transmitted a DCS signal, a MODEM training signal and a TCF signal (step 24), the receiver transmits a FTT signal if data errors beyond a predetermined value have been detected. Upon receipt of this FTT signal (N of step 25), the transmitter causes the data transmission speed to be shifted down by one step (step 45) and thereafter sends a DCS signal, a MODEM training signal and a TCF signal again. Thereafter, if another FTT signal has been again received, the data transmission speed is once again shifted down similarly. And, then, the transmission of image information is implemented with the data transmission speed at the time when a CFR signal has been received. In this manner, if the transmission of image information has been carried out at a data transmission rate other than 9,600 bps and the number of retransmissions has reached three times (Y of step 32), the number of error frames n is determined (step 34) and, if the then data transmission rate is, for example, equal to 2,400 bps (Y of step 35), since the data transmission rate cannot be shifted down any further, it proceeds to step 31 to terminate the transmission process.

On the other hand, if the then data transmission rate is 4,800 bps (from N of step 35 to step 36, from N of step 36 to step 46, and to Y of step 46), the data transmission rate is set at 2,400 bps (to step 38). If the then data transmission rate is 7,200 bps (from N of step 35 to step 36, from N of step 36 to step 46, and to N of step 46), the calculated error rate n/N is compared with a further predetermined value c (step 47). If the calculated error rate n/N is equal to or larger than the predetermined value c (Y of step 47), the data transmission rate is set at 2,400 bps (to step 38); on the other hand, if the calculated error rate n/N is less than the predetermined value c (N of step 47), the data transmission rate is set at 4,800 bps (step 43). In this manner, each of the initially set data transmission rate is shifted down to a desired value in accordance with the degree of deterioration of the network condition and then retransmission of image information is carried out with the shifted down data transmission rate.

As described above in detail, in accordance with this aspect of the present invention, the transmitter executes retransmission of one or more error frames of image information over a predetermined number of times and if all of these frames of image information have not been properly transmitted to the receiver, the transmitter calculates a ratio of the number of error frames n, which have been designated as frames to be retransmitted by PPR signals, to the total number of initially transmitted frames N in one block, i.e., error rate n/N, and the data transmission rate is shifted down to an appropriate value based on the thus calculated error rate n/N. Accordingly, the next retransmission of error frames can be carried out at a proper data transmission rate in commensurate with the degree of the current network condition. As a result, even if the network condition suddenly deteriorates during transmission of image information, retransmission of frames which would apparently produce data errors is prevented from being carried out unnecessarily so that the overall transmission time period can be maintained at minimum.

In the above-described embodiment, the error rate is calculated as a ratio of the number of retransmitted frames n to the total number of initially transmitted frames of a block N, i.e., n/N; however, this error rate may be calculated in any other desired method one example of which will be described below.

Figure 5:
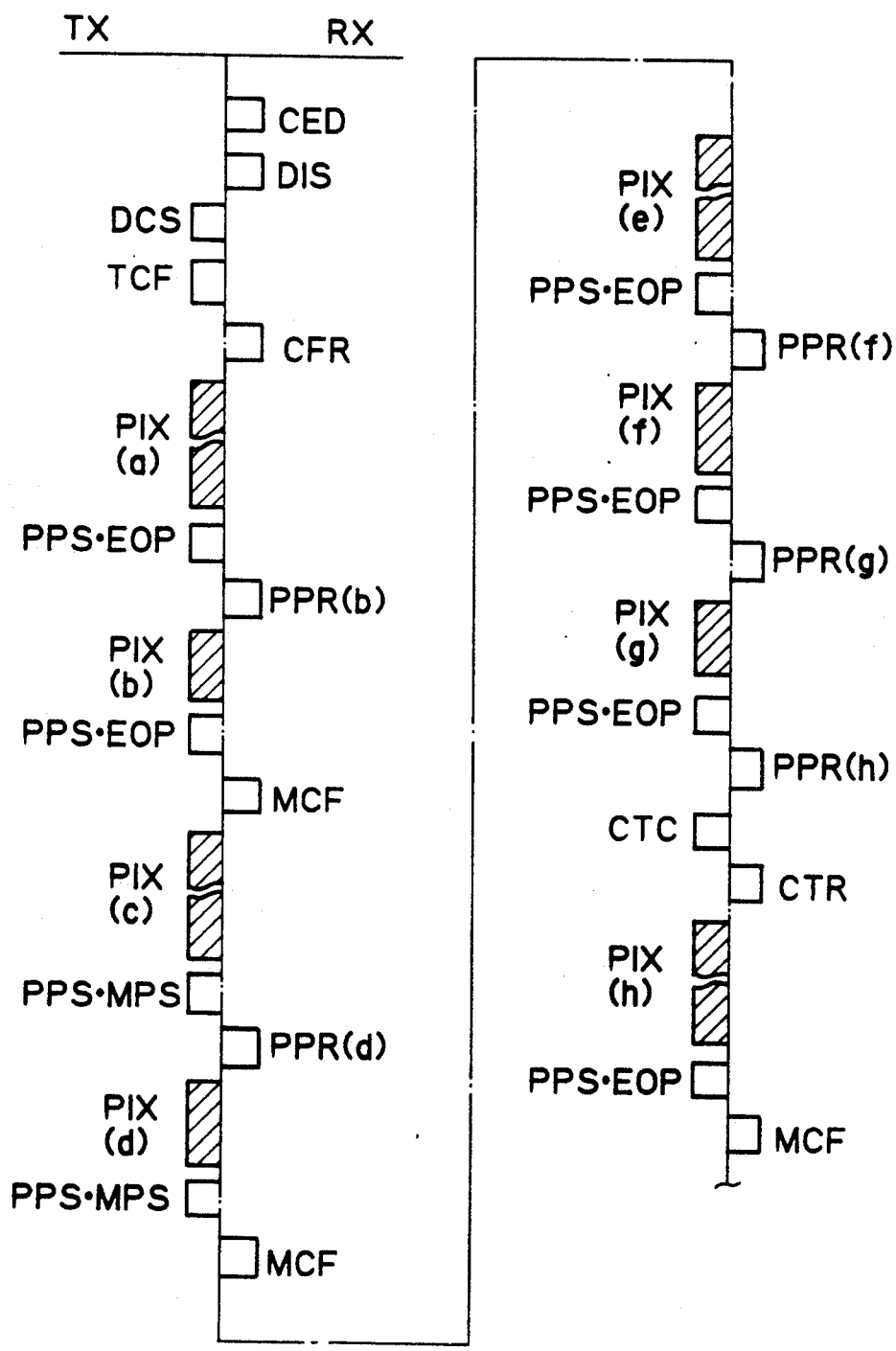
FIG. 5 is a timing chart showing one example of transmission control procedure useful for explaining an alternative method of calculating an error rate.

Here, let us assume that a transmission procedure illustrated in FIG. 5 is to be implemented. That is, the transmitter transmits a first block of image information having a number of frames, and in response thereto the receiver requests retransmission of b number of frames among the a number of frames which have been initially transmitted. Then, the transmitter retransmits the b number of frames to the receiver successfully. In succession, the transmitter transmits a second block of image information having c number of frames, among which d number of frames are retransmitted successfully. Then, a third block of image information having e number of frames is transmitted and thereafter f number of frames among the e number of frames are retransmitted; however, errors occur in g number of frames among the e number of frames and thus retransmission is carried out for the g number of frames. Furthermore, errors occur in h number of frames among the g number of frames, so that the transmitter transmits a CTC signal so as to carry out a data transmission speed shift down operation.

The following table illustrates various methods for calculating the error rate.

TABLE

| | Method of Calculating Error Rate | |
|---|---|---|
| (a) | $\dfrac{\text{No. of Retransmitted Frames}}{\text{Total No. of Frames}}$ | $= \dfrac{b + d + f + g + h}{a + b + c + d + e + f + g}$ |
| (b) | $\dfrac{\text{No. of Retransmitted Frames Per Page}}{\text{Total No. of Frames Per Page}}$ | $= \dfrac{b + d}{a + c}$ |
| (c) | $\dfrac{\text{No. of Error Blocks}}{\text{Total No. of Blocks}}$ | $= \dfrac{3}{3}$ |
| (d) | $\dfrac{\text{No. of Error Pages}}{\text{Total No. of Pages}}$ | $= \dfrac{2}{2}$ |

In the above Table, method (a) is a method in which the error rate is calculated as a ratio of the number of retransmitted frames to the total number of frames, and when this method is applied to the above-described embodiment, the error rate is calculated by dividing the number of retransmitted frames, i.e., (b+d+f+g+h), by the total number of frames, i.e., (a+b+c+d+e+f+g). In accordance with method (b), the error rate is determined as a ratio of the number of retransmitted frames per page to the total number of frames per page, and when this method is applied to the above-described embodiment, the error rate is determined by dividing the number of retransmitted frames per page, i.e., (b+d), by the total number of frames per page, i.e., (a+c). In accordance with method (c), the error rate is determined as a ratio of the number of error blocks to the total number of blocks, and when this method is applied to the above-described embodiment, the error rate is calculated to be 3/3. Finally, method (d) is a method in which the error rate is determined as a ratio of the number of error pages to the total number of pages, and when this method is applied to the above-described embodiment, the error rate is calculated to be 2/2.

Alternatively, in the methods (c) and (d), when determining error blocks and error pages, it is conceivable to determine the occurrence of error blocks or error pages when the number of error frames exceeds the total number of frames per block or page. As a further alternative, it may also be so structured to calculate the error rate by determining the number of error frames each time when a predetermined number of frames have been initially transmitted. Furthermore, the error rate may also be calculated by determining a ratio between the number of error frames and the total number of initially transmitted frames each time when image information for a predetermined magnitude of area of an original to be transmitted has been transmitted.

Figure 6:
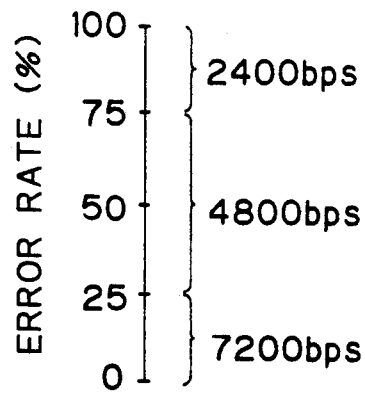
FIG. 6 is an illustration showing one example of a method for setting a data transmission speed by a shift-down function.

Let us suppose that transmission of image information has been initiated, for example, at 9,600 bps and the error rate has been calculated as described above. When a data transmission speed shift down operation is to be carried out based on the thus calculated error rate, the data transmission speed may be shifted down to 7,200 bps if the calculated error rate is 25% or less, to 4,800 bps if the calculated error rate is between 25% and 75%, and to 2,400 bps if the calculated error rate is larger than 75% as shown in FIG. 6, for example. In this case, a plurality of threshold values have been previously provided and the data transmission speed is shifted down to an optimal value by comparing the calculated error rate with these threshold values. These threshold values may be empirically determined. For example, these threshold values may be determined such that the data transmission rate be shifted down from 9,600 bps to an appropriate level so as to avoid the occurrence of data errors judging from the calculated error rate at 9,600 bps.

In the embodiment described in FIGS. 1 through 4, in the case of occurrence of data errors at a particular data transmission rate, retransmission is carried out three times at that rate; however, the number of repetition of retransmissions may be determined arbitrarily. In the case of the flow chart shown in this embodiment, if the network condition gradually deteriorates with the initial data transmission rate set for example at 9,600 bps, the data transmission rate may shift down three times step by step from 7,200 bps to 2,400 bps; however, it may also be so structured that the transmission process is terminated when the shift down operation has been carried out twice. In addition, in this embodiment, one frame of image information has been set at 256 bytes; however, this may also be set at 64 bytes as described in the Recommendations by CCITT.

Figure 7:
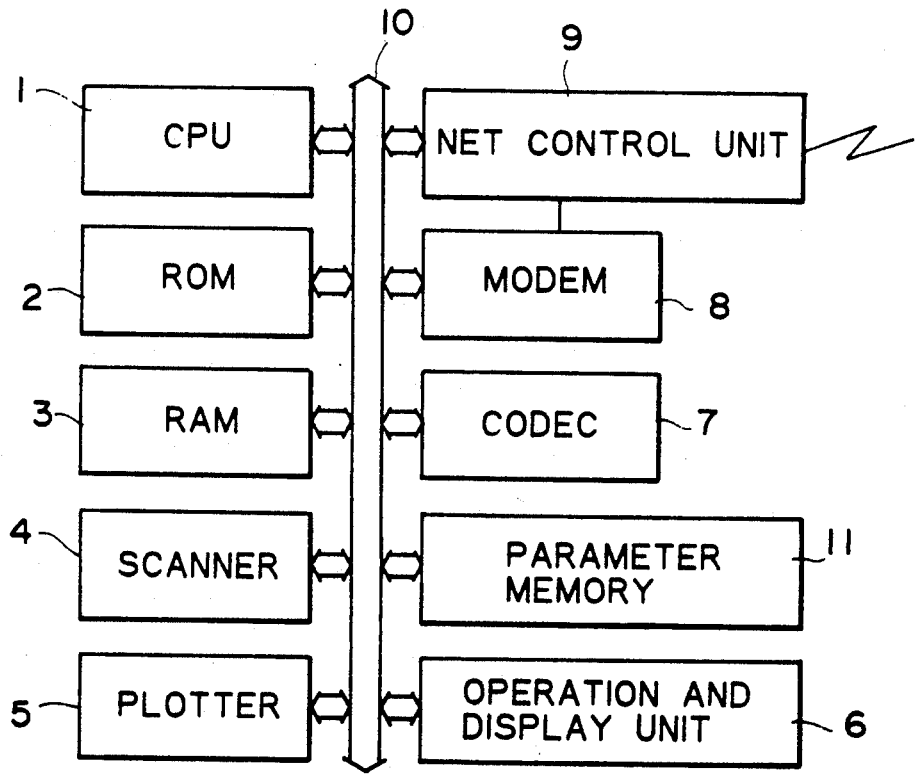
FIG. 7 is a block diagram showing the overall structure of a facsimile machine constructed in accordance with another embodiment of the present invention.
Figure 8:
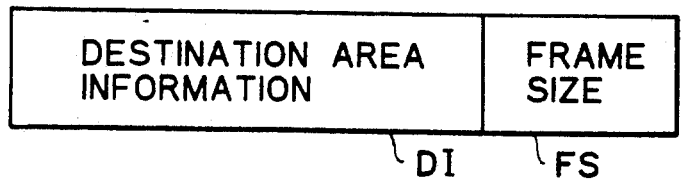
FIG. 8 is an illustration showing the contents and the format of data stored in the parameter memory 11 provided in the structure shown in FIG. 7.
Figure 91:
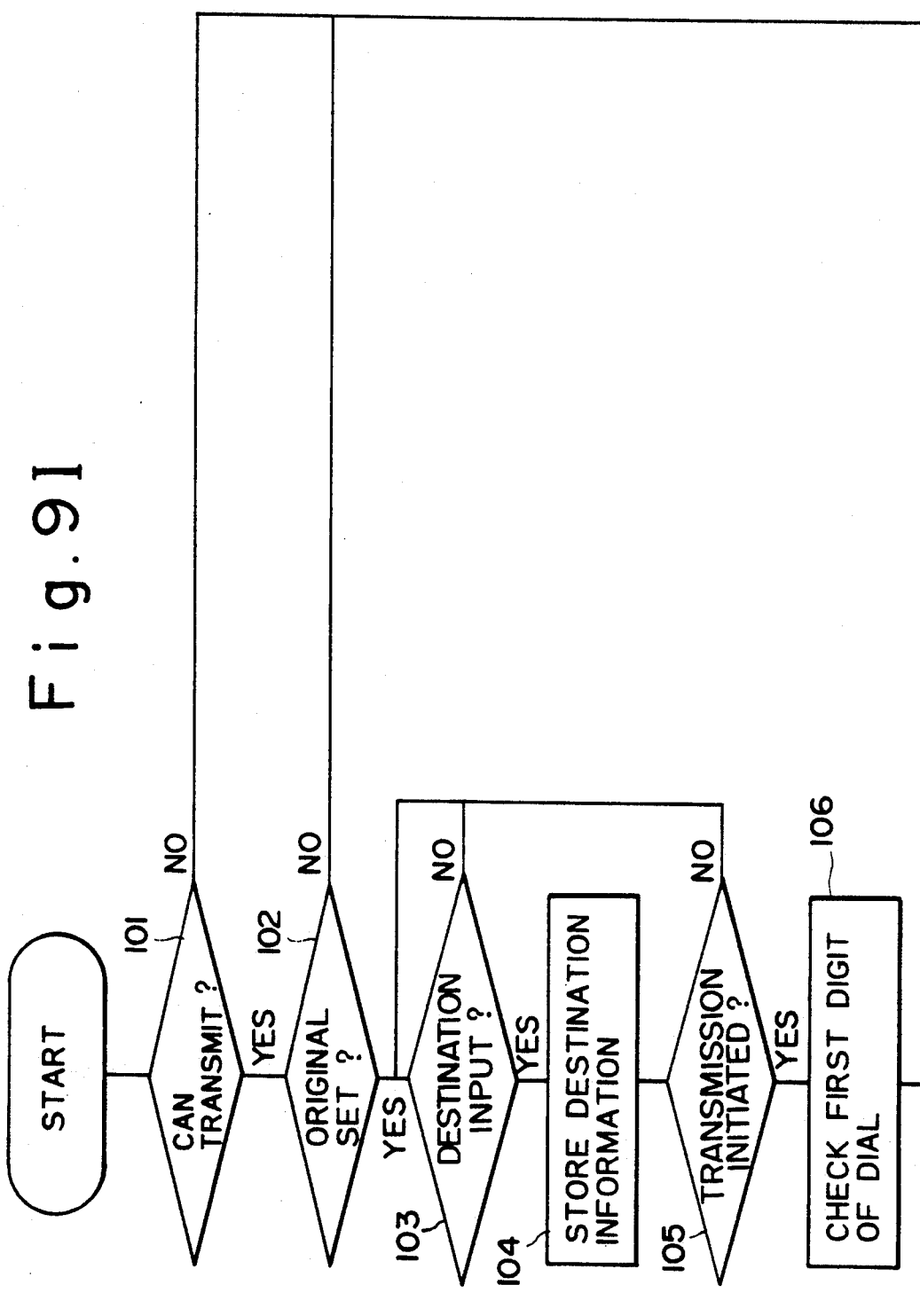
Figure 10:
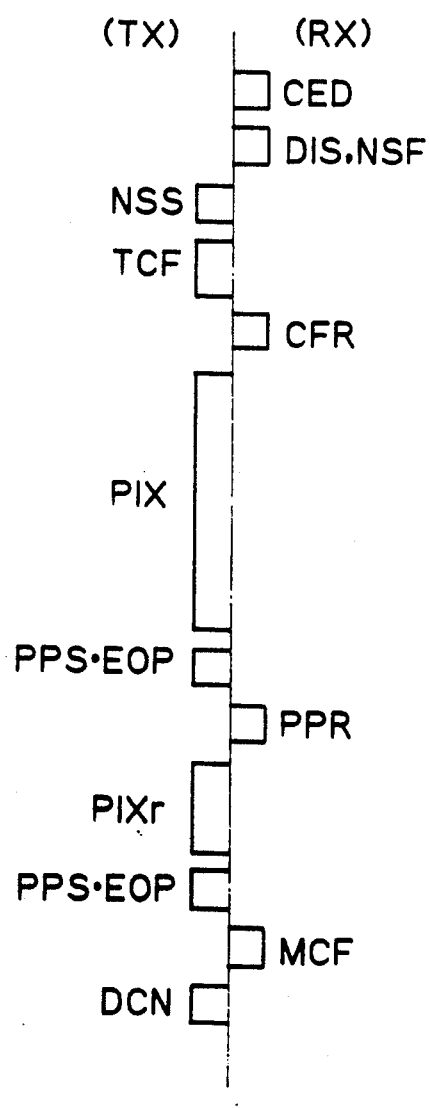
FIG. 10 is a timing chart useful for explaining a transmission procedure to be carried out in the structure shown in FIG. 7.

Referring now to FIG. 7, there is shown in block form the overall structure of a facsimile machine constructed in accordance with another embodiment of the present invention. As understood, the present embodiment is similar in many respects to the embodiment shown in FIG. 1, and, thus, like elements are indicated by like numerals. The present embodiment mainly differs from the previous embodiment shown in FIG. 1 in the additional provision of a parameter memory 11 which is preferably comprised of a non-volatile memory device, such as a semiconductor memory device. The parameter memory 11 stores a combination of data including destination area information DI, to which a selected ECM mode is applied based on a predetermined condition, and its associated frame size which is to be used when the associated area is selected, as shown in FIG. 8. Such data as destination area to which an ECM mode is applied and its associated frame size is set as in the following manner.

That is, when a call is placed to various destination areas on the earth, including foreign countries, from the source area in which the present facsimile machine has been installed, the network condition between a particular destination area and the source area remains substantially the same at all times. Under the circumstances, a list of network conditions between a particular source area and each of major destination areas may be established previously. And, when installing a facsimile machine at a particular area, it can be known which destination areas have excellent network conditions with the particular source area in which the facsimile machine is to be installed and which destination areas have terrible network conditions based on such a list. Thus, by referring to such a list, when installing a facsimile machine, those destination areas other than those having extremely good network condition and those having extremely bad network condition are selected as the destination area to which an error correction mode (ECM) is to be used. This is because, for those destination areas having an extremely good network condition, the occurrence of errors in transmitting image information is quite unlikely, so that it would not be necessary to use the ECM mode. In the case where the network condition is extremely bad, it is reasonably expected that data errors would vigorously occur also in retransmission of image information, so that the use of ECM mode in this case can only waste time and prolong the overall transmission time period without merit. As a result, the ECM mode can be most effectively used if it is used for the case where the network condition is intermediate between the extremely good and bad cases.

Then, for the selected destination area, the frame size is set at 256 bytes if the network condition is relatively good or at 64 bytes if the network condition is relatively bad. Each of destination area data DI and associated frame size data FS must be stored into the parameter memory 11 through the operation and display unit 6. In this manner, required information may be stored into the parameter memory 11 depending on a particular area in which the facsimile machine is installed and on each of destination areas having an intermediate degree of network condition with respect to the source area in which the facsimile machine is installed.

In operation, CPU 1 monitors the transmission operation conducted by an operator by implementing a process shown in FIG. 9. That is, it is first determined whether or not the facsimile machine is in a transmission enable state (step 101), and if its result is affirmative, then it is examined whether or not an original to be transmitted is set in the scanner 4 (step 102). If the result of determination at step 102 is affirmative with an original to be transmitted set in the scanner 4, before the initiation of transmission operation due to depression of a start key (not shown) provided in the operation and display unit 6 by an operator, destination information input through numerical keys (not shown) or the like provided in the operation and display unit 6 is stored (steps 103 through 105). In this case, in order to allow the facsimile machine to recognize the information regarding a destination area input by the operator, it should be so structured that the operator inputs destination area information separately from other information.

Upon inputting of a command for initiation of transmission by the operator, the CPU 1 examines the data of the first digit of the area information of the destination information thus input and examines whether or not any of the destination area information DI stored in the parameter memory 11 has a corresponding data (step 106). If affirmative, then each of the following data of the area information of the input address information is compared with the corresponding data to determine whether or not an identical information is stored in the parameter memory 11 or not (steps 107 through 109). If the area information of the input destination information agrees with one of the destination area information DI stored in the parameter memory 11 (YES of step 108), then it is decided to use the ECM mode (step 110) and the frame size FS corresponding to the thus found destination area information DI is set as the frame size to be used in the ECM mode (step 111). Then, it proceeds to a transmission process with the ECM mode. On the other hand, if no corresponding destination area information identical to the input destination information has been found (NO of step 107), then it is decided not to use the ECM mode (step 112), so that it proceeds to a normal transmission process without using the ECM mode. If the result of determination at step 101 or 102 is negative, it immediately returns to the original process. In this manner, the CPU 1 determines whether or not the ECM mode is to be used in a transmission process and also the frame size to be used in the ECM mode if the ECM mode is to be used in response to the destination information input by the operator.

Then, with an original to be transmitted set in the scanner 4, when the operator at the transmitter inputs destination information and a start command for transmission through the operation and display unit 6, the CPU 1 of the transmitter executes the above-described process to determine whether or not the ECM mode is to be used for that destination area and also determine the frame size, if the ECM mode is to be used. In this case, let us assume that the CPU 1 has determined to use the ECM mode and set the frame size at 256 bytes. Let us also assume that the number of originals set in the scanner 4 for transmission is only one and the size of image information obtained by compressing the image read from the original is equal to or less than 64 k bytes so that it can be fit into one block. Furthermore, it is also assumed that the destination or receiver facsimile machine has functions identical to those of the transmitter facsimile machine. Both of the transmitter and receiver facsimile machines are controlled by the CPU 1, but it will be simply described as transmitter and receiver operations in the following description.

The transmitter TX places a call to the receiver RX, and the receiver, upon receipt of a call from the transmitter, sends a CED signal, indicating itself to be a non-audio terminal to the transmitter, followed by DIS and NSF signals which indicate the standard and optical functions, respectively, the receiver has. Then, the transmitter sends an NSS signal to the receiver to apprise the receiver of the function to be used for communication and then the transmitter sends a MODEM training signal and a TCF signal to carry out MODEM training. If the result of the MODEM training is satisfactory, the receiver sends a CFR signal to the transmitter, so that in response to this signal the transmitter initiates the transmission of image information PIX. In this instance, at the transmitter, the original image is read by the scanner 4 to produce an image signal which is then compressed by coding by the codec 7, and then the thus compressed image information is temporarily stored in the buffer defined in a portion of the RAM 3 as being arranged in the form of frame data which has been described previously. Then, the frame data temporarily stored in the buffer is transferred to the MODEM 8 for modulation and the thus modulated frame data is transmitted to the receiver through the net control unit 9.

Upon completion of transmission of one page of image information PIX, a PPS signal and an EOP signal, which indicates the end of transmission, are transmitted from the transmitter to the receiver. The receiver temporarily stores the received image information in its RAM 3 and examines the presence of any data error in each of the data frames thus stored by referring to an error detecting code FCS. And, as a result of examination of the frame check sequence FCS of each of the frames received at the receiver, if the presence of any data error in one or more of the frames received, the receiver sends a partial page request signal PPR as described above to the transmitter to thereby apprise the transmitter of those data frames which have caused data errors at the receiver. Upon receipt of such a PPR signal, the transmitter transmits (retransmits to be exact) image information PIXr comprised only of data frames having one or more frame numbers designated by the receiver to the receiver, and upon completion of the retransmission of the requested data frames, PPS and EOP signals are transmitted to the receiver.

If the receiver has successfully received the image information PIXr without production of any data error, then it sends an MCF signal to the transmitter. As a result, the transmitter will know the fact that the image transmission operation has been properly completed, so that the transmitter sends a DCN signal to the receiver to have the network disconnected to terminate the image information transmission operation. As described above, if the receiver detects the occurrence of any data error in the received data, the receiver sends a request of retransmitting those frames in which one or more data errors have occurred to the transmitter, and, thus, in response to this request, the transmitter retransmits only those requested data frames to the receiver over a predetermined number of times, if necessary, thereby allowing for the receiver to receive image information accurately without delay.

As described above, in accordance with this aspect of the present invention, the information regarding the destination areas for which the ECM mode is to be used and the associated frame size to be used in the ECM mode is previously stored in the parameter memory 11, and if the destination input by the operator belongs to one of the destination areas stored in the parameter memory 11, it is determined that the ECM mode is to be used for communication, together with the selection of the associated frame size to be used in that particular destination area. Accordingly, it is not necessary for the operator to determine which of the normal and ECM modes is to be used and the frame size to be used as a preliminary step of carrying out transmission of particular image information to a particular destination. Thus, the burden of the operator in operating a facsimile machine is greatly relieved and it is also insured that the ECM mode is properly and automatically set depending on the circuit condition, so that the ECM mode can be used most effectively.

In the above-described embodiment, immediately after the completion of transmission operation by the operator, the selection between the ECM and normal modes and the setting of the frame size in the case when the ECM mode has been selected are carried out. However, the timing of execution of these processes can be carried out any time until the conditions for transmission of image information have been set. In the above-described embodiment, the contents of information stored in the parameter memory 11 are fixed. Alternatively, it may also be so structured that the result of transmission is stored for each destination and the contents of information stored in the parameter memory 11 are altered in accordance with the thus stored result. In addition, if the facsimile machine is equipped with an abbreviated dialing function, such as one-touch dialing function, it may be so structured that such information as selection between ECM and normal modes and the associated frame size in the case of the selection of the ECM mode as well as destination information is registered for each of abbreviated dial numbers. In this case, a plurality of information can be obtained at once simply by inputting an abbreviated dial number.

Figure 11A:
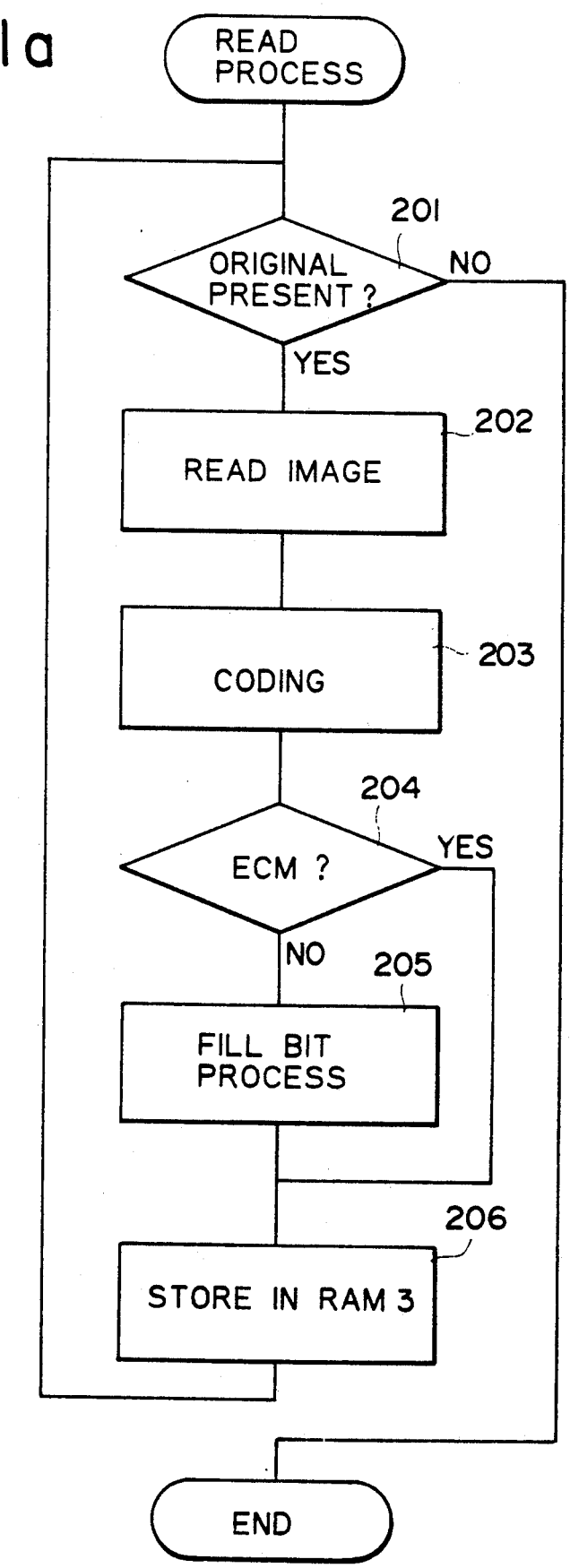
FIG. 11a is a flow chart showing a sequence of steps of an image reading process to be carried out at a transmitter in a further embodiment of the present invention.
Figure 11B:
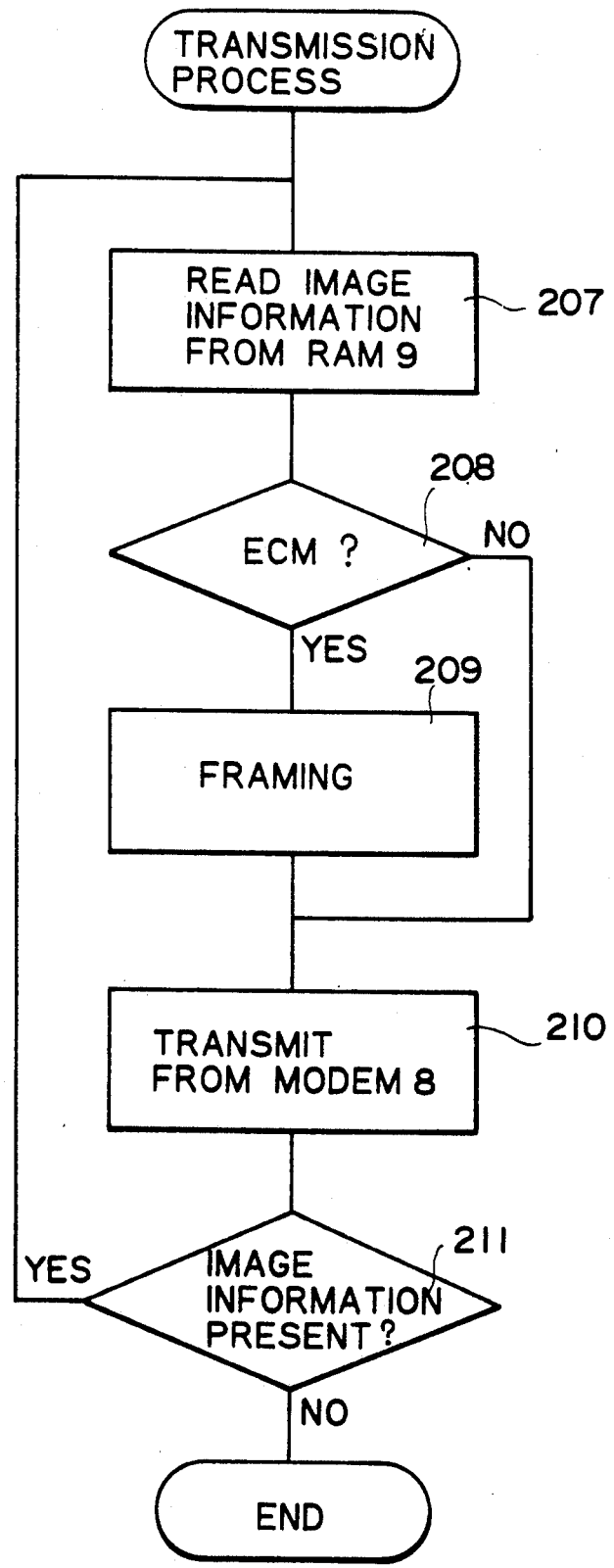
Figure 12A:
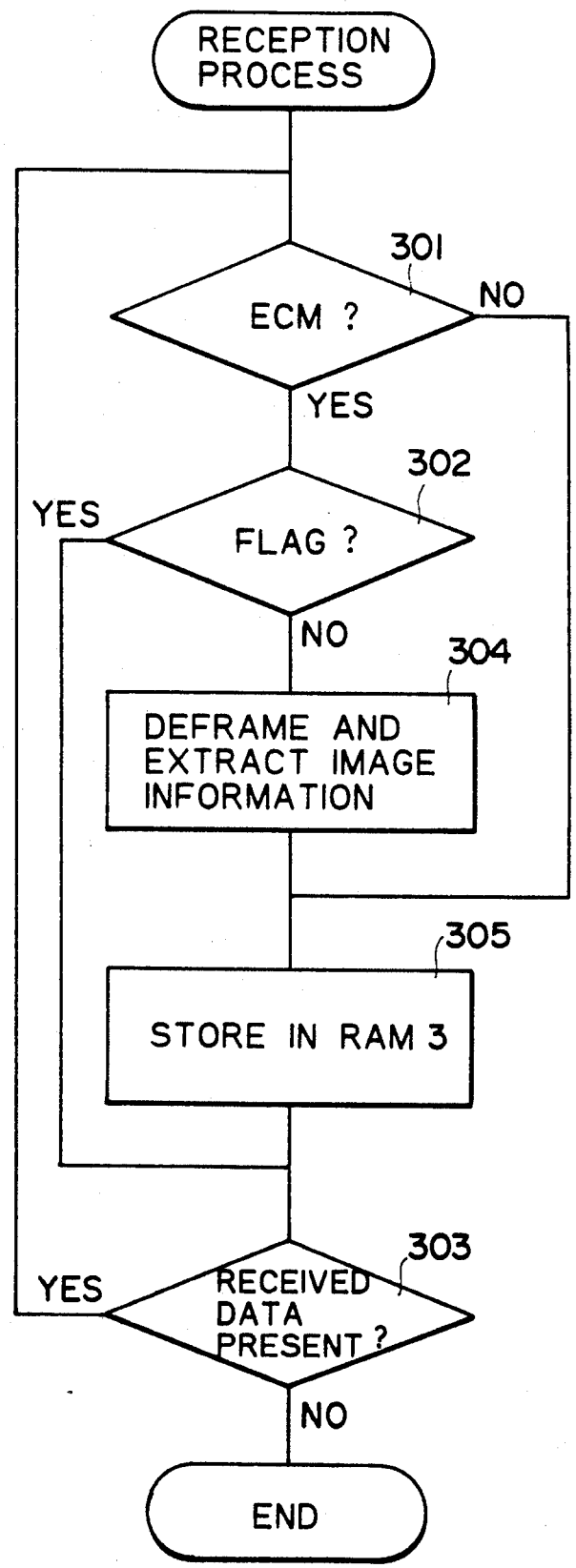
FIG. 12a is a flow chart showing a sequence of steps of an image information reception process to be carried out at a receiver in association with the embodiment shown in FIGS. 11a and 11b.
Figure 12B:
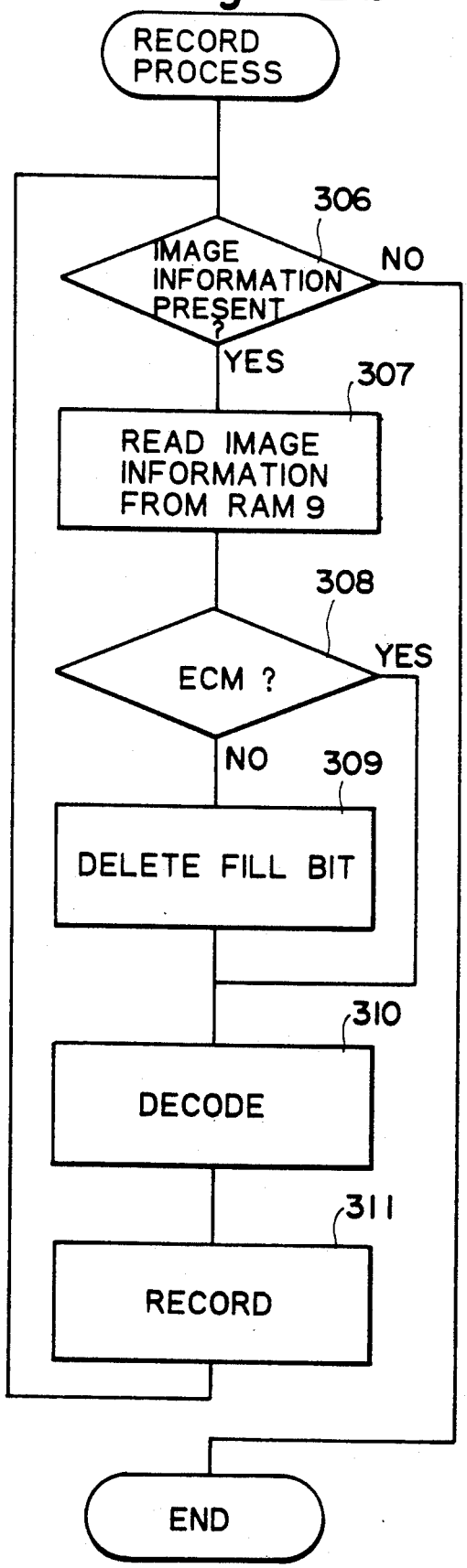

Now, a further aspect of the present invention will be described. It is to be noted that a facsimile machine of this aspect of the present invention has a structure identical to that illustrated in FIG. 1. The key feature of this aspect of the present invention resides in the fact that the RAM 3 is used as a common buffer memory for temporarily storing coded image information during transmission in the ECM mode or normal mode. A sequence of steps of transmission operation in this case is illustrated in FIGS. 11a and 11b and a sequence of steps in reception operation is illustrated in FIGS. 12a and 12b. In this case, the operator at the transmitter first sets an original to be transmitted in the scanner 4 and carries out a required operation, such as inputting of destination information, at the operation and display unit 6. As a result, the net control unit 9 executes a predetermined call placing operation. Upon receipt of a call by the receiver, a predetermined transmission control procedure is initiated between the transmitter and the receiver.

In a facsimile machine of the present embodiment, there is provided not only a communication function in a normal mode, but also a communication function in an ECM mode, and either one of these two modes is selected for use during the above-described transmission control procedure. Following this transmission control procedure, a transmission process of image information is initiated at the transmitter and a reception process for receiving transmitted image information is initiated at the receiver. At the transmitter, as shown in FIG. 11a, the scanner 4 is first activated to confirm the presence of an original to be transmitted (Y of step 201), so that the original information is read (step 202). Then, the image information thus read is coded line by line for data compression (step 203).

Then, the communication mode to be used is determined. If it is a normal mode (N of step 204), a fill bit process is carried out to add a predetermined data to the image information data of one line if the number of the image information data is less than a predetermined number for one line (step 205). In addition, although not shown specifically, an EOL code is added at the end of the image information for one line as a demarcation mark. The line data is then temporarily stored in the RAM 3 (step 206). The line data is temporarily stored in the RAM 3 so as to absorb the discrepancy between the speed of the above-described coding operation and the transmission speed of the MODEM 8. The line data stored in the RAM 8 is thus erased after it has been transmitted to the receiver.

In the case where the ECM mode is used (Y of step 204), an EOI code is directly added to the coded image information and then it is temporarily stored in the RAM 3 (step 206). The image information is temporarily stored because it will be retransmitted if it has not been properly transmitted to the receiver, so that the image information thus stored will remain stored until the transmitter receives a signal indicating the safe receipt of the image information from the receiver. Upon completion of such a process, it goes back to step 201 to carry out a similar process once again. Thus, image information is gradually stored in the RAM 3 line by line. Then, when the end of the original has been detected (Y of step 201), the above-described read process is terminated.

In parallel with the above-described read process, a transmission process is also carried out. That is, as shown in FIG. 11b, the image information stored in the RAM 3 as a result of the above-described process is then read out line by line (step 207). In the case of the ECM mode (Y of step 208), HDLC data frames are formed and various control information, above-described image information, CRC code, etc. are set in the data frames. Besides, insertion of "0" data in order to eliminate the bit pattern in each of the data frames identical to that of a flag F is carried out (step 209). The image information thus arranged in the form of data frames is then transmitted to the receiver through the MODEM 8 (step 210). On the other hand, in the case where the normal mode is used (N of step 208), the image information read out of the RAM 3 is supplied to the MODEM 8 as it is and then supplied for transmission (step 210).

Then, it is checked whether or not image information is present in the RAM 3 (step 211), and if there is (Y of step 211), it goes back to the above-described step 207 to carry out a similar process repetitively to transmit the image information line by line, and this transmission process is terminated when there is no image information left in the RAM 3 (N of step 211). In this manner, at the transmitter, image information is arranged in the form of a frame, for example, of 256 bytes and one block is formed by a consecutive series of 256 frames for transmission to the receiver. On the other hand, at the receiver, the above-described image information is received at the MODEM 8 from the transmitter. That is, as shown in FIG. 12a, in the first place, the type of the communication mode to be used is determined (step 301), and if it is the ECM mode (Y of step 301), then the location of a flag in the received data frame is detected (step 302), whereby when the location of a flag has been detected (Y of step 302), it goes back to step 301 after determining the fact that the following received data is present (Y of step 303).

If that portion of the data frame which is not the location of a flag has been detected (N of step 302), then a "0" deletion operation for deleting "0s" is carried out for that data stream. Then, each of the fields in the data frame is examined to thereby examine the presence of any data error by a CRC code which is also a data of that data frame. Then, the data frame is decomposed to have the image information extracted (step 304). The thus extracted image information is then temporarily stored in the RAM 3 (step 305). In the case of the normal mode (N of step 301), the received image information is directly stored in the RAM 3 (step 305).

Thereafter, if there is any received data left (Y of step 303), it goes back to step 301 to repeat a similar process as described above. And, if there is no more received data (Y of step 303), then the reception process is terminated.

In parallel with the above-described reception process, a recording process is carried out. That is, if it has been found that image information is stored in the RAM 3 (Y of step 306), the image information stored in the RAM 3 is read out line by line as shown in FIG. 12b (step 307). Then, the communication mode is examined (step 308) and if it is set in the normal mode (N of step 308), after removing the fill bits added at step 205 of the flow shown in FIG. 11a (step 309), it is restored in the form of the original image information by decoding (step 310). In the case of the ECM mode (Y of step 308), the image information read out of the RAM 3 is decoded directly (step 310). And, then, the thus decoded image information is supplied to the plotter 5 for recording an image on a recording medium (step 311). Thereafter, it goes back to step 306 to repeat a similar process. In this manner, the received image information is recorded line by line and when there is no more image information left in the RAM 3 (N of step 306), the recording process is terminated.

As described above, at the receiver, one block of image information is received continuously. Thereafter, although not shown specifically, the frame number of each of the data frames in which one or more of data errors have been found by the CRC code is sent to the transmitter in accordance with a predetermined transmission control procedure. In this case, upon receipt of one or more of such frame numbers, the transmitter reads out the corresponding image information from the RAM 3 and retransmits this image information to the receiver.

Figure 13:
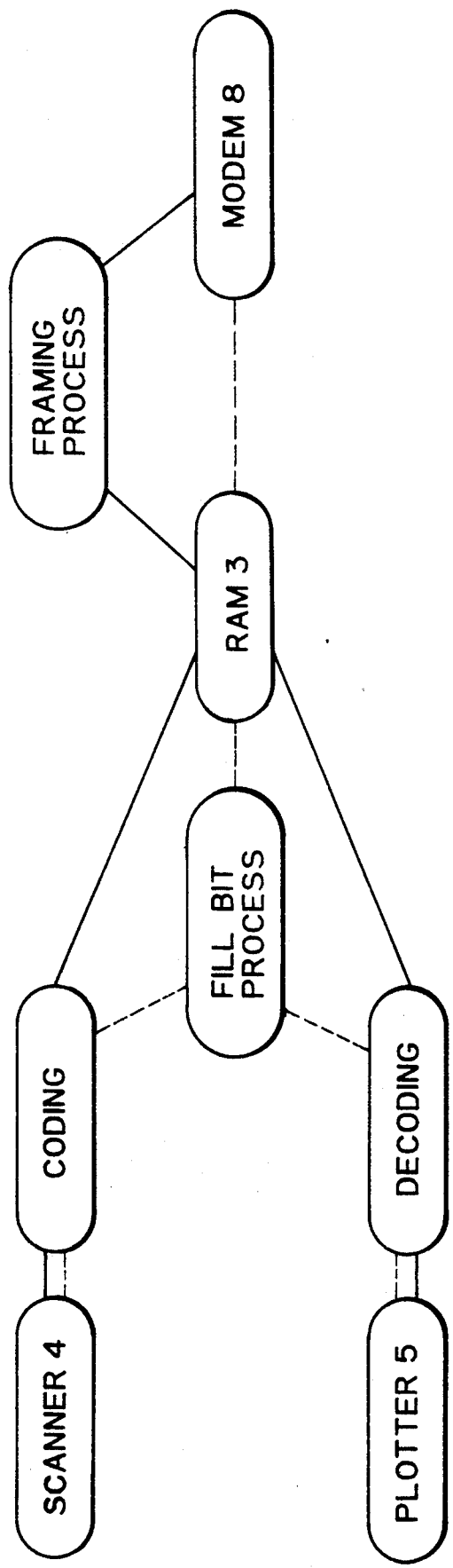
FIG. 13 is a schematic illustration showing the flow of image information in the embodiment shown in FIGS. 11a, 11b, 12a and 12b.

FIG. 13 schematically illustrates the flow of data within the facsimile machine either at the transmitter or at the receiver at each of the processes described above. That is, in the case of the normal mode, during transmission, as indicated by the dotted lines, image information is read by the scanner 4 and compressed by coding. Then, the thus coded image information is temporarily stored in the RAM 3 after having been subjected to fill-bit processing, and the image information is transmitted to the receiver directly through the MODEM 8. On the other hand, during reception, received image information is temporarily stored in the RAM 3 directly through the MODEM 8 and then the image information is read out of the RAM 3 line by line to be decoded into the original uncompressed image information after having been subjected to the fill-bit processing. Thereafter, the thus recovered original image information is then supplied to the plotter 5 to record an image on a recording sheet.

On the other hand, in the case of the ECM mode, as indicated by the solid lines, during transmission, coded image information is temporarily stored into the RAM 3 directly, and after arranging the image information in the form of predetermined data frames, the image information is transmitted to the receiver. During reception, the received data frames are decomposed to extract the image information which is then temporarily stored in the RAM 3 and decoded to recover the original image information which, in turn, is supplied to the plotter 5 for recording an image on a recording medium.

As described above, in accordance with this aspect of the present invention, the RAM 3 is used as a common buffer memory for temporarily storing coded image information during transmission in the ECM mode and also for temporarily storing coded image information until it is transmitted to the receiver during transmission in the normal mode. With this structure, it is not necessary to provide two separate buffer memories as in the prior art structure so that the manufacturing cost may be reduced.

In the case of the ECM mode, since coded image information prior to formation in the form of data frames is stored in the RAM 3, the memory capacity required for the RAM 3 is relaxed as compared with the case in which image information is stored after it has been arranged in the form of predetermined data frames. That is, one block of image information is 64 k bytes at maximum, so that the capacity of the RAM 3 may well be 64 k bytes. Moreover, since a communication is carried out by a common control program both in the ECM and normal modes, a transmission and reception process can be simplified. In the embodiment described above, although the RAM 3 is commonly used between the ECM and normal modes, it may also be so structured to commonly use the RAM 3 as a buffer memory for storing image information to be retransmitted or for storing image information for a transmission process. Thus, the common use of the RAM 3 should not be viewed only with the ECM mode of CCITT, but it may be commonly used for other purposes as well.

As described above, in accordance with one aspect of the present invention, since the shift-down operation of the data transmission speed is carried out based on the total number of one block of frames which have been initially transmitted and the number of error frames in which one or more data errors have occurred at the receiver, an optimal data transmission speed can be set immediately depending on the quality of the network condition. Thus, it is insured that the image information can be transmitted to the receiver without repeating unnecessary retransmission operations, which contributes to maintain the overall transmission time period at minimum.

Furthermore, in accordance with another aspect of the present invention, since provision is made of a parameter memory for storing information regarding destination areas to which an error correction mode of operation is to be used and associated frame sizes to be used in the ECM mode, it is insured that the ECM mode is set up automatically if the destination address input by the operation is the one registered in the parameter memory. In addition, when the ECM mode is set up in this manner, its associated frame size is also automatically set as read from the parameter memory. As a result, the ECM mode can be used most effectively at all times while relieving the operator of a burden to determine its necessity to set up the ECM mode and to set up the ECM mode for use.

In accordance with a further aspect of the present invention, there is provided a structure in which use is made of a common buffer memory for temporarily storing coded image information during transmission in the ECM mode and also for temporarily storing image information during transmission in the normal mode, the number of parts is reduced, which contributes to reduce the manufacturing cost.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A method for shifting down a data transmission speed at a transmitter in response to a request from a receiver for retransmission of data frames having data errors in a facsimile system, comprising the steps of:
   transmitting a plurality of data frames of image information from said transmitter to said receiver at a first data transmission speed;
   examining at said receiver whether or not each of said data frames contains one or more data errors;
   transmitting a request from said receiver to said transmitter for retransmission of one or more data frames for which one or more data errors have occurred at the receiver; and
   shifting down said data transmission speed from said first data transmission speed to a second data transmission speed which is used for retransmitting said one or more data frames for which one or more data errors have occurred, whereby said second data transmission speed is determined selectively in accordance with a predetermined manner based on information regarding a total number of data frames which have been transmitted from said transmitter to said receiver and also a number of data frames to be retransmitted wherein a Plurality of data transmission speeds are previously provided for selection and one of said plurality of data transmission speeds is automatically selected by comparing a plurality of predetermined numbers with a ratio which ratio is formed by said total number of data frames divided b said number of data frames to be retransmitted.

2. A method for shifting down a data transmission speed at a transmitter in response to a request from a receiver for retransmission of data frames having data errors in a facsimile system, comprising the steps of:
   transmitting a plurality of data frames of image information from said transmitter to said receiver at a first data transmission speed;
   examining at said receiver whether or not each of said data frames contains one or more data errors;
   transmitting a request from said receiver to said transmitter for retransmission of one or more data frames for which one or more data errors have occurred at the receiver; and
   shifting down said data transmission speed from said first data transmission speed to a second data transmission speed which is used for retransmitting said one or more data frames for which one or more data errors have occurred, whereby said second data transmission speed is determined selectively in accordance with a predetermined manner based on information regarding a total number of data frames which have been transmitted from said transmitter to said receiver and also a number of data frames to be retransmitted wherein a plurality of data transmission speeds are previously provided for selection and one of said plurality of data transmission speeds is automatically selected by comparing a plurality of predetermined numbers with a ratio which ratio is formed by said number of data frames number of data frames to be retransmitted divided by said total number of data frames.

3. A facsimile machine comprising:
   reading means for reading an original to be transmitted;
   processing means for processing image information supplied from said reading means to produce a plurality of data frames from said image information;
   transmitting means for transmitting said plurality of data frames to a receiver facsimile machine at a remote location through a transmission path; and
   control means for controlling said reading means, said processing means and said transmitting means, said control means controlling a data transmission speed of said transmitting means such that the data transmission speed is shifted down from a first speed to a second speed when retransmitting one or more of said plurality of data frames, whereby said second speed is determined automatically in accordance with a predetermined program based on a total number of said plurality of data frames and a number of said data frames to be retransmitted further including a plurality of previously provided selectable data transmission speeds and a means for automatically selecting one of said plurality of data transmission speeds by comparing a plurality of predetermined numbers with a ratio which ratio is formed by said number of data frames to be retransmitted divided by said total number of data frames.

4. The facsimile machine of claim 3, further comprising first storing means for temporarily storing image information and data frames.

5. The facsimile machine of claim 4, further comprising second storing means for storing said predetermined program.

6. The facsimile machine of claim 3, wherein said processing means first converts said image information supplied from said reading means into digital image data before converting said image information into said data frames.

7. The facsimile machine of claim 6, wherein said transmission line is a public telephone line, and said facsimile machine further comprises a MODEM for converting said data frames into suitable data appropriate for transmission through said public telephone line.

8. The facsimile machine of claim 6, wherein said processing means includes a compressing means for compressing said digital image data by coding, said digital image data being compressed before being formed into data frames.

9. The facsimile machine of claim 8 wherein said compressing means is a CODEC.

10. A facsimile machine system having both a first transmission mode, in which a plurality of data frames formed from image information are first transmitted to a receiver and then one or more of said plurality of data frames are retransmitted to said receiver upon request from said receiver, and a normal transmission mode, in which image information is transmitted directly to a receiver without being formed into data frames, comprising:
- reading means for reading an original to be transmitted;
- transmitting means for transmitting said image information to a receiver at a remote location through a transmission path, said image information being transmitted to said receiver after having being formatted in the form of predetermined data frames when transmitting in said first transmission mode and without having been formatted in the form of predetermined data frames when transmitting in said normal transmission mode;
- inputting means for inputting one or more operational commands and/or information to said transmitting means and said receiver;
- storing means for storing first information regarding destination areas in which said first transmission mode is to be used and second information regarding a data frame size to be used in each of said destination areas; and
- control means for controlling said reading means, said transmitting means, said inputting means and said storing means, said controlling means comparing destination information input through said inputting means with the destination areas stored in said storing means to determine whether or not said destination information input through said inputting means matches with one of said destination areas, whereby if there is a match, said image information is transmitted to said receiver in said first transmission mode, and, otherwise, said image information is transmitted to said receiver in said normal transmission mode.

11. The facsimile machine of claim 10, wherein said storing means includes a non-volatile memory.

12. The facsimile machine of claim 10, wherein said first transmission mode is an error correction mode, whereby said retransmission is carried out for one or more of said plurality of data frames for which one or more data errors have occurred at said receiver upon receipt.

13. The facsimile machine of claim 10, wherein said normal transmission mode is a mode in which said image information is first converted into digital image information and compressed by coding according to a predetermined coding method.

14. The facsimile machine of claim 13, wherein said transmission path is a public telephone line and said coded digital image information is modulated so as to be allowed to be transmitted through said public telephone line.

15. The facsimile machine of claim 10, wherein said inputting means includes an operation and display unit which may be manually operated by an operator.

16. The facsimile machine of claim 10, wherein said destination areas are those areas whose network conditions between communicating facsimile machine are between extremely bad and good levels.

17. The facsimile machine of claim 10, wherein each of said data frames has a HDLC data frame format.

18. The facsimile machine of claim 10, wherein a predetermined number of said data frames are collected as a block and said data frames are transmitted to said receiver block by block.

19. A facsimile machine system comprising:
- means for producing a plurality of data frames of image information which is to be transmitted;
- transmitting means for transmitting said plurality of data frames to a receiver facsimile machine at a remote location through a transmission path; and
- control means for controlling said means for producing and said transmitting means, said control means controlling a data transmission speed of said transmitting means such that the data transmission speed is shifted down from a first speed to a second speed when retransmitting one or more of said plurality of data frames, whereby said second speed is determined automatically in accordance with a predetermined program based on a total number of said plurality of data frames and a number of said data frames to be transmitted further including a plurality of previously provided selectable data transmission speeds and a means for automatically selecting one of said plurality of data transmission speeds by comparing a plurality of predetermined numbers with a ratio which ratio is formed by said number of data frames to be retransmitted divided by said total number of data frames.

20. The machine system according to claim 19, wherein said means for producing includes a reading means for reading and original to be transmitted and a processing means for processing image information supplied from said reading means to produce said plurality of data frame.

21. The system of claim 20 further comprising a first storing means for temporarily storing image information and data frames.

22. The system according to claim 21 further comprising second storing means for storing said predetermined program.

23. A facsimile machine having both a first transmission mode, in which a plurality of data frames formed from image information are first transmitted to a receiver and then one or more of said plurality of data frames are retransmitted to said receiver upon request from said receiver, and a normal transmission mode, in which image information is transmitted directly to a receiver without being formed into data frames, comprising:
- means for converting information into image information to be transmitted;
- transmitting means for transmitting said image information to a receiver at a remote location through a transmission path, said image information being transmitted to said receiver after being formatted in the form of predetermined data frames when transmitting in said first transmission mode and without having been formatted in the form of predetermined data frames when transmitting in said normal transmission mode;
- inputting means for inputting one or more operational commands and/or information to said transmitting means and said receiver;
- storing means for storing first information regarding destination areas in which said first transmission mode is to be used and second information regarding a data frames size to be used in each of said destination areas; and
- control means for controlling said reading means, said transmitting means, said inputting means and said storing means, said controlling means comparing destination information input through said inputting means with the destination areas stored in said storing means to determine whether or not said destination information input through said inputting means matches with one of said destination areas, whereby if there is a match, said image information is transmitted to said receiver in said first transmission mode, and, otherwise, said image information is transmitted to said receiver in said normal transmission mode.

24. The facsimile system according to claim 23, wherein said means for converting includes a reading means for reading an original to be transmitted.

25. The facsimile machine system of claim 23, wherein said storing means includes a non-volatile memory.

26. The facsimile machine system of claim 23, wherein said first transmission mode is an error correction mode, whereby said retransmission is carried out for one or more of said plurality of data frames for which one or more data errors have occurred at said receiver upon receipt.

27. The facsimile machine system of claim 23, wherein said normal transmission mode is a mode in which image information is first converted into digital image information and compressed by coding according to a predetermined coding according to a predetermined coding method.

* * * * *